United States Patent
Liu

(10) Patent No.: US 10,567,054 B2
(45) Date of Patent: Feb. 18, 2020

(54) CHANNEL STATE INFORMATION SENDING METHOD AND RECEIVING METHOD, APPARATUS, AND SYSTEM

(71) Applicant: Huawei Technologies Co., Ltd., Shenzhen, Guangdong (CN)

(72) Inventor: Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/266,735

(22) Filed: Feb. 4, 2019

(65) Prior Publication Data
US 2019/0181930 A1 Jun. 13, 2019

Related U.S. Application Data

(63) Continuation of application No. PCT/CN2017/094757, filed on Jul. 27, 2017.

(30) Foreign Application Priority Data

Aug. 5, 2016 (CN) .......................... 2016 1 0639121

(51) Int. Cl.
*H04B 7/0456* (2017.01)
*H04B 7/06* (2006.01)
*H04B 7/04* (2017.01)

(52) U.S. Cl.
CPC ............. *H04B 7/0486* (2013.01); *H04B 7/04* (2013.01); *H04B 7/0456* (2013.01);
(Continued)

(58) Field of Classification Search
USPC ....................................................... 375/267
See application file for complete search history.

(56) References Cited

U.S. PATENT DOCUMENTS 8,873,666 B2 * 10/2014 Kakishima ........... H04B 7/0652
375/259
9,270,428 B2    2/2016 Moulsley et al.
(Continued)

FOREIGN PATENT DOCUMENTS

CN     104620626 A  *  5/2015
CN     104620626 B     5/2015
(Continued)

OTHER PUBLICATIONS

3GPP TSG RAN1 #61bis, R1-104134, Motorola, "Two Component Feedback Design and Codebooks", Jun. 28-Jul. 2, 2010. XP50449570A. 11 pages.

*Primary Examiner* — Wednel Cadeau
(74) *Attorney, Agent, or Firm* — Slater Matsil, LLP

(57) ABSTRACT

This application provides a channel state information (CSI) sending method, an apparatus, and a system. In this solution, a terminal device feeds back a first rank used for a common channel and a first precoding matrix indicator, and feeds back a second rank used for a traffic channel and a second precoding matrix indicator to a base station. The first precoding matrix indicator is used to indicate a first precoding matrix in a first precoding matrix set. The second precoding matrix indicator is used to indicate a second precoding matrix in a second precoding matrix set. The first precoding matrix set is different from the second precoding matrix set. Different precoding matrix sets are used on the common channel and the traffic channel, to obtain channel state information, thereby reducing bits required for feedback while satisfying a system requirement.

20 Claims, 4 Drawing Sheets

(52) U.S. Cl.
CPC .......... *H04B 7/0478* (2013.01); *H04B 7/063* (2013.01); *H04B 7/065* (2013.01); *H04B 7/0626* (2013.01); *H04B 7/0632* (2013.01); *H04B 7/0639* (2013.01)

(56) References Cited

U.S. PATENT DOCUMENTS

| | | |
|---|---|---|
| 2012/0087401 A1* | 4/2012 | Bhattad ................ H04B 7/0486 375/224 |
| 2012/0218948 A1 | 8/2012 | Onggosanusi et al. |
| 2013/0044624 A1 | 2/2013 | Su et al. |
| 2013/0315189 A1 | 11/2013 | Kim et al. |
| 2014/0079149 A1 | 3/2014 | Lee et al. |

FOREIGN PATENT DOCUMENTS

| | | |
|---|---|---|
| CN | 104901733 A | 9/2015 |
| WO | 2014198032 A1 | 12/2014 |
| WO | 2015003367 A1 | 1/2015 |

\* cited by examiner

CHANNEL STATE INFORMATION SENDING METHOD AND RECEIVING METHOD, APPARATUS, AND SYSTEM

CROSS-REFERENCE TO RELATED APPLICATIONS

This application is a continuation of International Application No. PCT/CN2017/094757 filed on Jul. 27, 2017, which claims priority to Chinese Patent Application No. 201610639121.X filed on Aug. 5, 2016. The aforementioned patent applications are hereby incorporated by reference in their entireties.

TECHNICAL FIELD

The present application relates to the field of wireless communications technologies, and in particular, to a channel state information sending method and receiving method, an apparatus, and a system.

BACKGROUND

A multiple-input multiple-output (MIMO) technology, that is, a multiple-antenna technology, is widely used in a Long Term Evolution (LTE) system. Affected by factors such as the atmosphere and plants, in some cases, wireless transmission has a very large path loss. A precoding technology in multiple antennas can compensate for the loss to an extent.

To compensate for path losses of a common channel and a traffic channel, a terminal device may feed back channel state information (CSI) of the common channel and CSI of the traffic channel to a base station. The base station performs precoding on sent data by using the fed-back CSI. However, in the prior art, when the terminal device feeds back the CSI of the common channel and the CSI of the traffic channel, overheads required for feeding back the CSI are relatively large, wasting a system resource.

SUMMARY

This application describes a CSI sending method and receiving method, an apparatus, and a system. Different CSI sets are used for a common channel and a traffic channel to obtain CSI. Overheads required for feeding back the CSI are reduced while satisfying requirements of the common channel and the traffic channel.

According to a first aspect, an embodiment of this application provides a CSI sending method. The method includes:

determining, by a terminal device, a first rank used for a first channel and a second rank used for a second channel, where the first rank is indicated by a first rank indicator, the second rank is indicated by a second rank indicator, and a channel type of the first channel is different from a channel type of the second channel;

determining, by the terminal device, a first precoding matrix in a first precoding matrix set, and determining a second precoding matrix in a second precoding matrix set, where the first precoding matrix set is different from the second precoding matrix set, a rank of the first precoding matrix is the first rank, the first precoding matrix is indicated by a first precoding matrix indicator, a rank of the second precoding matrix is the second rank, and the second precoding matrix is indicated by a second precoding matrix indicator; and sending, by the terminal device, the first rank indicator, the second rank indicator, the first precoding matrix indicator, and the second precoding matrix indicator; or sending, by the terminal device, the second rank indicator, the first precoding matrix indicator, and the second precoding matrix indicator, where the first rank indicator is a predefined value. Because a feature of the first channel and a feature of the second channel may be different, different precoding matrix sets are used; and when the first precoding matrix set is suitable for the first channel and the second precoding matrix set is suitable for the second channel, overheads required for feeding back a precoding matrix indicator by the terminal device can be reduced while satisfying a system requirement.

Optionally, the first precoding matrix indicator is represented by $B_1$ bits, the second precoding matrix indicator is represented by $B_2$ bits, the $B_1$ bits and the $B_2$ bits are partially overlapped, and $B_1$ and $B_2$ are positive integers greater than 1. The first precoding matrix indicator and the second precoding matrix indicator have common bits. Therefore, the overheads required for feeding back a precoding matrix indicator by the terminal device can be reduced.

According to a second aspect, an embodiment of this application provides a CSI sending method. The method includes:

determining, by a terminal device, a first rank used for a first channel and a second rank used for a second channel, where the first rank is indicated by a first rank indicator, the second rank is indicated by a second rank indicator, and a channel type of the first channel is different from a channel type of the second channel;

determining, by the terminal device, a first precoding matrix in a first precoding matrix set, and determining a second precoding matrix in a second precoding matrix set, where the first precoding matrix set is different from the second precoding matrix set, a rank of the first precoding matrix is the first rank, a rank of the second precoding matrix is the second rank, and the first precoding matrix and the second precoding matrix are indicated by a third precoding matrix indicator; because a feature of the first channel and a feature of the second channel may be different, different precoding matrix sets are used; and when the first precoding matrix set is suitable for the first channel and the second precoding matrix set is suitable for the second channel, overheads required for feeding back a precoding matrix indicator by the terminal device may be reduced while satisfying a system requirement; and because the third precoding matrix indicator indicates the first precoding matrix in the first precoding matrix set and indicates the second precoding matrix in the second precoding matrix set, the overheads required for feeding back a precoding matrix indicator by the terminal device can be reduced; and sending, by the terminal device, the first rank indicator, the second rank indicator, and the third precoding matrix indicator; or sending, by user equipment, the second rank indicator and the third precoding matrix indicator, where the first rank indicator is a predefined value.

According to a third aspect, an embodiment of this application provides a CSI receiving method. The method includes:

obtaining, by a base station, a first rank indicator, a second rank indicator, a first precoding matrix indicator, and a second precoding matrix indicator, where the first precoding matrix indicator, the second precoding matrix indicator, and the second rank indicator are obtained from a terminal device, and the first rank indicator is obtained from the terminal device or the first rank indicator is a predefined value; and determining a first precoding matrix based on the first precoding matrix indicator, and determining a second precoding matrix based on the second precoding matrix indicator, where the first rank indicator is used to indicate a first rank, the second rank indicator is used to indicate a second rank, the first rank is used for a first channel, the second rank is used for a second channel, and a channel type of the first channel is different from a channel type of the second channel;

a rank of the first precoding matrix is the first rank, and the first precoding matrix is in a first precoding matrix set; and a rank of the second precoding matrix is the second rank, and the second precoding matrix is in a second precoding matrix set.

The first precoding matrix set is different from the second precoding matrix set. Because a feature of the first channel and a feature of the second channel may be different, different precoding matrix sets are used; and when the first precoding matrix set is suitable for the first channel and the second precoding matrix set is suitable for the second channel, a quantity of bits required for feeding back a precoding matrix indicator by the terminal device or a quantity of bits required for receiving a precoding matrix indicator by the base station may be reduced while satisfying a system requirement. Therefore, complexity of the base station and the terminal device is reduced and power consumption is reduced.

According to a fourth aspect, an embodiment of this application provides a CSI receiving method. The method includes:

obtaining, by a base station, a first rank indicator, a second rank indicator, and a third precoding matrix indicator, where the second rank indicator and the third precoding matrix indicator are obtained from a terminal device, and the first rank indicator is obtained from the terminal device or the first rank indicator is a predefined value; and determining a first precoding matrix and a second precoding matrix based on the third precoding matrix indicator.

The first rank indicator is used to indicate a first rank, the second rank indicator is used to indicate a second rank, the first rank is used for a first channel, and the second rank is used for a second channel. A channel type of the first channel is different from a channel type of the second channel.

A rank of the first precoding matrix is the first rank, and the first precoding matrix is in a first precoding matrix set. A rank of the second precoding matrix is the second rank, and the second precoding matrix is in a second precoding matrix set. The first precoding matrix set is different from the second precoding matrix set. Because a feature of the first channel and a feature of the second channel may be different, different precoding matrix sets are used; and when the first precoding matrix set is suitable for the first channel and the second precoding matrix set is suitable for the second channel, a quantity of bits required for receiving a precoding matrix indicator by the base station can be reduced while satisfying a system requirement. Therefore, complexity of the base station is reduced and power consumption is reduced.

Because the third precoding matrix indicator indicates the first precoding matrix in the first precoding matrix set and indicates the second precoding matrix in the second precoding matrix set, overheads required for feeding back a precoding matrix indicator by the terminal device can be reduced.

According to a fifth aspect, an embodiment of this application provides a terminal device. The terminal device has a function of implementing behavior of the terminal device in the foregoing method design. The function may be implemented by hardware, or may be implemented by hardware executing corresponding software. The hardware or software includes one or more modules corresponding to the foregoing function. The module may be software and/or hardware.

The terminal device includes:

a processing unit, configured to determine a first rank used for a first channel and a second rank used for a second channel, where the first rank is indicated by a first rank indicator, the second rank is indicated by a second rank indicator, and a channel type of the first channel is different from a channel type of the second channel, where the processing unit is further configured to: determine a first precoding matrix in a first precoding matrix set, and determine a second precoding matrix in a second precoding matrix set, where the first precoding matrix set is different from the second precoding matrix set, a rank of the first precoding matrix is the first rank, the first precoding matrix is indicated by a first precoding matrix indicator, a rank of the second precoding matrix is the second rank, and the second precoding matrix is indicated by a second precoding matrix indicator; and a sending unit, configured to send the first rank indicator, the second rank indicator, the first precoding matrix indicator, and the second precoding matrix indicator; or configured to send the second rank indicator, the first precoding matrix indicator, and the second precoding matrix indicator, where the first rank indicator is a predefined value.

According to a sixth aspect, an embodiment of this application provides another terminal device. The terminal device has a function of implementing behavior of the terminal device in the foregoing method design. The function may be implemented by hardware, or may be implemented by hardware executing corresponding software. The hardware or software includes one or more modules corresponding to the foregoing function. The module may be software and/or hardware.

The terminal device includes:

a processing unit, configured to determine a first rank used for a first channel and a second rank used for a second channel, where the first rank is indicated by a first rank indicator, the second rank is indicated by a second rank indicator, and a channel type of the first channel is different from a channel type of the second channel, where the processing unit is further configured to determine a first precoding matrix in a first precoding matrix set, and determine a second precoding matrix in a second precoding matrix set, where the first precoding matrix set is different from the second precoding matrix set, a rank of the first precoding matrix is the first rank, a rank of the second precoding matrix is the second rank, and the first precoding matrix and the second precoding matrix are indicated by a third precoding matrix indicator; and a sending unit, configured to send the first rank indicator, the second rank indicator, and the third precoding matrix indicator; or configured to send the second rank indicator and the third precoding matrix indicator, where the first rank indicator is a predefined value.

According to a seventh aspect, an embodiment of this application provides a base station. The base station has a function of implementing behavior of the base station in the foregoing method design. The function may be implemented by hardware, or may be implemented by hardware executing corresponding software. The hardware or software includes one or more modules corresponding to the foregoing function.

The base station includes:

an obtaining unit, configured to obtain a first rank indicator, a second rank indicator, a first precoding matrix indicator, and a second precoding matrix indicator, where the first precoding matrix indicator, the second precoding matrix indicator, and the second rank indicator are obtained from a terminal device, and the first rank indicator is obtained from the terminal device or the first rank indicator is a predefined value; and a processing unit, configured to determine a first rank based on the first rank indicator, determine a second rank based on the second rank indicator, determine a first precoding matrix based on the first precoding matrix indicator, and determine a second precoding matrix based on the second precoding matrix indicator.

The first rank is used for a first channel, the second rank is used for a second channel, and a channel type of the first channel is different from a channel type of the second channel.

A rank of the first precoding matrix is the first rank, and the first precoding matrix is in a first precoding matrix set.

A rank of the second precoding matrix is the second rank, and the second precoding matrix is in a second precoding matrix set.

The first precoding matrix set is different from the second precoding matrix set.

According to an eighth aspect, an embodiment of this application provides another base station. The base station has a function of implementing behavior of the base station in the foregoing method design. The function may be implemented by hardware, or may be implemented by hardware executing corresponding software. The hardware or software includes one or more modules corresponding to the foregoing function.

The base station includes:

an obtaining unit, configured to obtain a first rank indicator, a second rank indicator, and a third precoding matrix indicator, where the second rank indicator and the third precoding matrix indicator are obtained from a terminal device, and the first rank indicator is obtained from the terminal device or the first rank indicator is a predefined value; and a processing unit, configured to determine a first precoding matrix and a second precoding matrix based on the third precoding matrix indicator.

The first rank is used for a first channel, the second rank is used for a second channel, and a channel type of the first channel is different from a channel type of the second channel.

A rank of the first precoding matrix is the first rank, and the first precoding matrix is in a first precoding matrix set.

A rank of the second precoding matrix is the second rank, and the second precoding matrix is in a second precoding matrix set.

The first precoding matrix set is different from the second precoding matrix set.

According to the first aspect and the second aspect, there are further the following optional designs.

Optionally, the first channel is a common channel, and the second channel is a traffic channel. Because a feature of the common channel and a feature of the traffic channel may be different, the first precoding matrix set may be defined based on a channel feature and a requirement feature of the common channel, and the second precoding matrix set may be defined based on a channel feature and a requirement feature of the traffic channel. In this way, use of different precoding matrix sets on the common channel and the traffic channel can reduce overheads required for feeding back a precoding matrix indicator by the terminal device while satisfying a system requirement.

Optionally, the terminal device sends a second CQI to the base station, where the second CQI is obtained based on the second precoding matrix; or the terminal device sends a first CQI and a second CQI to the base station, where the first CQI is obtained based on the first precoding matrix, and the second CQI is obtained based on the second precoding matrix. The terminal device sends the first CQI to the base station, so that the base station may determine a proper modulation scheme on the first channel based on the first CQI. The terminal device sends the second CQI to the base station, so that the base station may determine a proper modulation scheme on the second channel based on the second CQI.

When the terminal device sends only the second CQI to the base station and does not send the first CQI, a predefined modulation scheme may be used for data sent on the first channel, thereby saving signaling for notifying of the modulation scheme.

According to the third aspect and the fourth aspect, there are further the following optional designs.

Optionally, the first channel is a common channel, and the second channel is a traffic channel. Because a feature of the common channel and a feature of the traffic channel may be different, the first precoding matrix set may be defined based on a channel feature and a requirement feature of the common channel, and the second precoding matrix set may be defined based on a channel feature and a requirement feature of the traffic channel. In this way, use of different precoding matrix sets on the common channel and the traffic channel can reduce overheads required for feeding back a precoding matrix indicator by the terminal device while satisfying a system requirement.

Optionally, the base station receives a second CQI sent by the terminal device, where the second CQI is obtained based on the second precoding matrix; or the base station receives a first CQI and a second CQI that are sent by the terminal device, where the first CQI is obtained based on the first precoding matrix, and the second CQI is obtained based on the second precoding matrix. The base station receives the first CQI, and may determine a proper modulation scheme on the first channel based on the first CQI. The base station receives the second CQI, and may determine a proper modulation scheme on the second channel based on the second CQI.

When the base station receives only the second CQI and does not receive the first CQI, a predefined modulation scheme may be used for data sent on the first channel, thereby saving signaling for notifying of the modulation scheme.

According to the fifth aspect and the sixth aspect, there are further the following optional designs.

Optionally, the first channel is a common channel, and the second channel is a traffic channel. Because a feature of the common channel and a feature of the traffic channel may be different, the first precoding matrix set may be defined based on a channel feature and a requirement feature of the common channel, and the second precoding matrix set may be defined based on a channel feature and a requirement feature of the traffic channel. In this way, use of different precoding matrix sets on the common channel and the traffic channel can reduce overheads required for feeding back a precoding matrix indicator by the terminal device while satisfying a system requirement.

Optionally, the sending unit is further configured to send a second CQI to the base station, where the second CQI is obtained based on the second precoding matrix; or the sending unit is further configured to send a first CQI and a second CQI to the base station, where the first CQI is obtained based on the first precoding matrix, and the second CQI is obtained based on the second precoding matrix.

The sending unit sends the first CQI to the base station, so that the base station may determine a proper modulation scheme on the first channel based on the first CQI. The sending unit sends the second CQI to the base station, so that the base station may determine a proper modulation scheme on the second channel based on the second CQI.

When the sending unit sends only the second CQI to the base station and does not send the first CQI, a predefined modulation scheme may be used for data sent on the first channel, thereby saving signaling for notifying of the modulation scheme.

According to the seventh aspect and the eighth aspect, there are further the following optional designs.

Optionally, the first channel is a common channel, and the second channel is a traffic channel. Because a feature of the common channel and a feature of the traffic channel may be different, the first precoding matrix set may be defined based on a channel feature and a requirement feature of the common channel, and the second precoding matrix set may be defined based on a channel feature and a requirement feature of the traffic channel. In this way, use of different precoding matrix sets on the common channel and the traffic channel can reduce overheads required for feeding back a precoding matrix indicator by the terminal device while satisfying a system requirement.

Optionally, the base station further includes:

a receiving unit, configured to receive a second CQI sent by the terminal device, where the second CQI is obtained based on the second precoding matrix; or a receiving unit, configured to receive a first CQI and a second CQI that are sent by the terminal device, where the first CQI is obtained based on the first precoding matrix, and the second CQI is obtained based on the second precoding matrix.

The receiving unit receives the first CQI, and may determine a proper modulation scheme on the first channel based on the first CQI. The receiving unit receives the second CQI, and may determine a proper modulation scheme on the second channel based on the second CQI.

When the receiving unit receives only the second CQI and does not receive the first CQI, a predefined modulation scheme may be used for data sent on the first channel, thereby saving signaling for notifying of the modulation scheme.

According to the first aspect to the eighth aspect, there are further the following optional designs.

Optionally, the first precoding matrix $W^A$ satisfies that $W^A = W_1^A \times W_2^A$, where $W^A$ is an $N_t$-row by $R_A$-column matrix, $N_t$ is a quantity of antenna ports of a reference signal sent by the base station, $R_A$ is the first rank, $N_t$ is greater than or equal to $R_A$, $W_1^A$ is an $N_t$-row by 2M-column matrix, $W_2^A$ is a 2M-row by $R_A$-column matrix, $R_A$, M, and $N_t$ are positive integers, and M is greater than or equal to 2.

The second precoding matrix $W^B$ satisfies that $W^B = W_1^B \times W_2^B$, where $W^B$ is an $N_t$-row by $R_B$-column matrix, $R_B$ is the second rank, $W_1^B$ is an $N_t$-row by 2K-column matrix, $W_2^B$ is a 2K-row by $R_B$-column matrix, and $R_B$ and K are positive integers.

Optionally, K is less than or equal to M, and 2M columns in $W_1^A$ include each column in $W_1^B$. Vectors in $W_1^A$ include vectors in $W_1^B$. Therefore, when the terminal device sends the first precoding matrix indicator and the second precoding matrix indicator to the base station, a quantity of bits required for sending a precoding matrix indicator can be reduced.

Optionally, each precoding matrix in the first precoding matrix set satisfies that $W^1 = W_1^1 \times W_2^1$, where $W^1$ is an $N_t$-row by $R_A$-column matrix, $N_t$ is the quantity of the antenna ports of the reference signal sent by the base station, $R_A$ is the first rank, $N_t$ is greater than or equal to $R_A$, $W_1^1$ is an $N_t$-row by 2M-column matrix, $W_2^1$ is a 2M-row by $R_A$-column matrix, $N_t$, $R_A$, and M are positive integers, and M is greater than or equal to 2.

Each precoding matrix in the second precoding matrix set satisfies that $W^2 = W_1^2 \times W_2^2$, where is an $N_t$-row by $R_B$-column matrix, $R_B$ is the second rank, $N_t$ is greater than or equal to $R_B$, $W_1^2$ is an $N_t$-row by 2K-column matrix, $W_2^2$ is a 2K-row by $R_B$-column matrix, and $R_B$ and K are positive integers.

Optionally, K is less than or equal to M, a random $W_1^1$ in the first precoding matrix set corresponds to $W_1^2$ in the second precoding matrix set, and 2M columns in a random $W_1^1$ in the first precoding set include each column in $W_1^2$ that is in the second precoding matrix set and that corresponds to the random $W_1^1$ in the first precoding set. Vectors in $W_1^1$ include vectors in $W_1^2$. Therefore, when the terminal device sends the first precoding matrix indicator and the second precoding matrix indicator to the base station, a quantity of bits required for sending a precoding matrix indicator can be reduced.

Optionally, $$W_1^1 = \begin{bmatrix} X_1 & 0 \\ 0 & X_1 \end{bmatrix},$$

where $X_1$ is an $N_t/2$-row by M-column matrix, and $N_t$ is an even number. $X_1 = [v_0 \ldots v_{M-1}]$, where $v_d$ is a column vector including $N_t/2$ elements, and d is an integer ranging from 0 to M−1. A random column in $W_2^1$ is represented by $$\begin{bmatrix} e_l \\ \phi_n e_l \end{bmatrix},$$

where $\phi_n$ is a complex number, $e_l$ is an M×1 column vector, an $l^{th}$ element of $e_l$ is 1, the remaining elements are 0, and l is an integer ranging from 1 to M.

Optionally, $$W_1^2 = \begin{bmatrix} X_2 & 0 \\ 0 & X_2 \end{bmatrix},$$

where $X_2$ is an $N_t/2$-row by K-column matrix, and $N_t$ is an even number. $X_2 = [z_0 \ldots z_{k-1}]$, where $z_d$ is a column vector including $N_t/2$ elements, and d is an integer ranging from 0 to K−1. A random column in $W_2^2$ is represented by $$\begin{bmatrix} e_m \\ \phi_k e_m \end{bmatrix},$$

where $\phi_k$ is a complex number, $e_m$ is a K×1 column vector, an $m^{th}$ element of $e_m$ is 1, the remaining elements are 0, and m is an integer ranging from 1 to K.

A reason for which the foregoing structures are used for $W_1^1$, $W_1^2$, $W_2^1$, and $W_2^2$ is mainly that currently applied antenna arrays are mainly dual-polarized antenna arrays. The foregoing precoding matrix structures can enable beam directions of antennas in two polarization directions to be the same. This relatively well matches a channel feature of a dual-polarized antenna array. Therefore, desirable performance can be achieved by using the foregoing precoding matrix structures.

Optionally, the first CQI and the second CQI correspond to a same frequency domain resource. When the two CQIs correspond to a same frequency domain resource, overheads required for feeding back a CQI can be reduced by using a channel feature of the first channel and a channel feature of the second channel.

Optionally, the first CQI and the second CQI are represented in a differential manner. The overheads required for feeding back a CQI can be reduced if the differential manner is used for representation.

Optionally, the first precoding matrix $W^A$ is a matrix generated based on $W_1^A$ or $W_1^B$ and according to a first synthesis rule. The first synthesis rule is a predefined rule or a rule configured by the base station. By using a synthesis method, the terminal device does not need to send bits of a precoding matrix indicator used to indicate $W_2^A$, thereby reducing overheads of feedback performed by the terminal device.

Optionally, the first channel is a common channel, and the second channel is a traffic channel.

According to the fifth aspect to the eighth aspect, the sending unit may be a transmitter, the receiving unit may be a receiver, the processing unit may be a processor, and the obtaining unit may be a processor, or may be a processor and a receiver.

An embodiment of the present disclosure further provides a system. The system includes the terminal device and the base station in the foregoing embodiments.

Compared with the prior art, in the solutions provided in this application, different precoding matrix sets are used for the common channel and the traffic channel. Because a feature of the common channel and a feature of the traffic channel may be different, the first precoding matrix set may be defined based on a channel feature and a requirement feature of the common channel, and the second precoding matrix set may be defined based on a channel feature and a requirement feature of the traffic channel. In this way, use of different precoding matrix sets on the common channel and the traffic channel can reduce overheads required for feeding back a precoding matrix indicator by the terminal device while satisfying a system requirement.

DETAILED DESCRIPTION

Network architectures and business scenarios described in the embodiments of the present disclosure aim to more clearly describe the technical solutions in the embodiments of the present disclosure, but are not intended to limit the technical solutions provided in the embodiments of the present disclosure. A person of ordinary skill in the art may know that as the network architectures evolve and a new business scenario emerges, the technical solutions provided in the embodiments of the present disclosure are further applicable to a similar technical problem.

It should be understood that, the technical solutions in the embodiments of the present disclosure may be applied to various communications systems, for example, a Long Term Evolution (LTE) system, an LTE frequency division duplex (FDD) system, and an LTE time division duplex (TDD) communications system.

It should be further understood that in the embodiments of the present disclosure, a terminal device (terminal equipment) may be referred to as a terminal, or may be user equipment (UE), a mobile station (MS), a mobile terminal, a notebook computer, or the like. The terminal device may communicate with one or more core networks by using a radio access network (RAN). For example, the terminal device may be a mobile phone (or referred to as a "cellular" phone) or a computer with a mobile terminal. For example, the terminal device may be a portable, pocket-sized, hand-held, computer built-in, or in-vehicle mobile apparatus, which exchanges voice and/or data with the radio access network.

In the embodiments of the present disclosure, a base station may be an evolved NodeB ("eNB or e-NodeB") in an LTE system, may be another base station, or may be an access network device such as a relay. This is not limited in the present disclosure.

Figure 1:
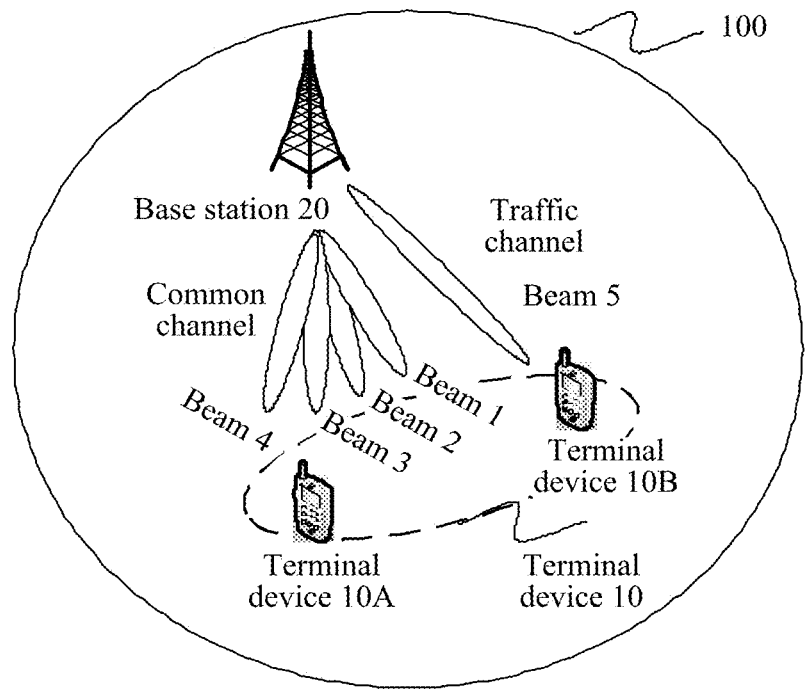
FIG. 1 is a schematic diagram of a communications system according to an embodiment of the present disclosure.

An embodiment of the present disclosure provides a solution based on a communications system shown in FIG. 1, to improve performance of a common channel and a traffic channel. This embodiment of the present disclosure provides a communications system 100. The communications system 100 at least includes at least one base station and a plurality of terminal devices. The plurality of terminal devices communicate with the base station. In downlink, the base station communicates with the terminal devices at least by using a common channel and a downlink traffic channel. Using FIG. 1 as an example, the base station 20 communicates with a terminal device 10. The terminal device 10 includes a terminal device 10A and a terminal device 10B. In uplink, the terminal devices communicate with the base station by using an uplink control channel and an uplink traffic channel. Downlink is a direction in which the base station sends data to the terminal devices, and uplink is a direction in which the terminal devices send data to the base station. The common channel may be a common control channel, for example, a physical downlink control channel (PDCCH). The base station sends control information, for example, scheduling information for the terminal device, on the PDCCH. The downlink traffic channel may be a channel on which the base station sends downlink service data to user equipment, for example, a physical downlink shared channel (PDSCH). The uplink control channel may be a physical uplink control channel (PUCCH). In an LTE system, a terminal device may send a rank indicator (RI), a precoding matrix indicator (PMI), and a channel quality indicator (CQI) to a base station on the PUCCH. The uplink traffic channel may be a physical uplink shared channel (PUSCH). In an LTE system, a terminal device sends uplink service data to a base station on the PUSCH.

To compensate for a path loss of a channel, the terminal device feeds back channel state information (CSI) to the base station. The base station determines a precoding matrix based on the CSI and performs precoding on data based on the precoding matrix. In the LTE system, the CSI information fed back by the terminal device may include the RI, the PMI, the CQI, or the like. The RI is used to indicate an amount of data spatial multiplexing, which is equal to a quantity of columns of the precoding matrix. The PMI is used to indicate the precoding matrix. The base station obtains the precoding matrix by using the RI and the PMI that are fed back by the terminal device. If an RI is specified, one PMI is used to indicate one precoding matrix in a precoding set corresponding to the RI. One RI corresponds to a plurality of precoding matrices. A plurality of precoding matrices corresponding to one RI are a precoding matrix set corresponding to the RI. The CQI is used to indicate, when the RI and the PMI are specified, channel quality of data received by the terminal device.

Using FIG. 1 as an example, for the downlink traffic channel, the base station performs precoding on data of the downlink traffic channel based on CSI fed back by the terminal device 10B, for example, sends downlink data to the terminal device 10B by using a beam 5. For the downlink traffic channel, because the base station 20 performs precoding on the data of the downlink traffic channel based on the CSI fed back by the terminal device 10B, the terminal device 10B can obtain relatively desirable receiving performance. Similarly, because the base station 20 performs, based on CSI fed back by the terminal device 10A, precoding on data of a downlink traffic channel sent to the terminal device 10A, the terminal device 10A can obtain relatively desirable receiving performance.

For the common channel, the base station may send the common channel by using different beams in turns at different moments. For example, four beams are used to send the common channel in turns. At a moment 1, the base station 20 sends the common channel by using a beam 1; at a moment 2, the base station 20 sends the common channel by using a beam 2; at a moment 3, the base station 20 sends the common channel by using a beam 3; and at a moment 4, the base station 20 sends the common channel by using a beam 4. The terminal devices 10A and 10B both need to receive the data of the common channel. For the downlink traffic channel, the base station 20 performs precoding on the data of the downlink traffic channel based on the CSI fed back by the terminal device 10B, and sends downlink data to the terminal device 10B by using the beam 5. For the downlink traffic channel, because the base station 20 performs precoding on the data of the downlink traffic channel based on the CSI fed back by the terminal device 10B, the terminal device 10B can obtain relatively desirable receiving performance. However, for the common channel, because the base station 20 sends the common channel by using beams in turns, quality of the beam 1 received by the terminal device 10A at the moment 1 is relatively desirable. However, when the terminal device 10A moves to another location, quality of a signal that is sent by using the beam 1 and that is received by the terminal device 10A is very poor. If in this case, the base station still sends the common channel by using the beam 1, and data on the common channel is sent to the terminal device 10A, quality of a signal of the common channel received by the terminal device 10A is very poor.

For the common channel, the base station may alternatively perform precoding on the common channel by using a precoding matrix in a precoding matrix set of a traffic channel. However, for the traffic channel, to better obtain a gain of adaptive modulation and coding, a quantity of required precoding matrices is greater than that for the common channel. When a same service precoding matrix set is used for the traffic channel and the common channel, for the common channel, overheads required for feeding back a precoding matrix indicator are increased.

A beam generated by a precoding matrix of the traffic channel is relative narrow, and the data on the common channel is to be sent to a plurality of users. Therefore, if precoding is performed by using the precoding matrix of the traffic channel, it is possible that not all users can have desirable receiving quality. For example, when the base station 20 needs to send data to the terminal device 10A and the terminal device 10B on the common channel, receiving performance of the terminal device 10A is poor if the common channel is sent by using the beam 5, and receiving performance of the terminal device 10B is poor if the common channel is sent by using the beam 3.

To improve receiving performance of the common channel, the CSI of the common channel may be sent to the base station by the terminal device with consideration of a feature of the common channel and a feature of the traffic channel. In addition, the base station uses different precoding matrix sets for the common channel and the traffic channel. In this way, for requirements of the common channel and the traffic channel, precoding matrix sets relatively good for the common channel and the traffic channel are respectively used.

To reduce a quantity of bits of CSI that is sent by a terminal device and that is received by a base station, reduce complexity of the base station, and reduce power consumption, in an embodiment of the present disclosure, a method for synthesizing a precoding matrix is provided on a base station side. The base station obtains a first rank indicator, a second rank indicator, and a precoding matrix indicator. The second rank indicator may be received by the base station from the terminal device. The first rank indicator may be received by the base station from the terminal device, or the first rank indicator may be a predefined value, and be directly obtained by the base station based on the predefined value.

The precoding matrix indicator may include a first precoding matrix indicator and a second precoding matrix indicator. The base station determines a first precoding matrix $W^A$ based on the first precoding matrix indicator, and determines a second precoding matrix $W^B$ based on the second precoding matrix indicator. A rank of the first precoding matrix $W^A$ is a first rank. The second precoding matrix $W^B$ is determined based on the second precoding matrix indicator. A rank of the second precoding matrix $W^B$ is a second rank.

Alternatively, the precoding matrix indicator includes a third precoding matrix indicator. The base station determines a first precoding matrix $W^A$ and a second precoding matrix $W^B$ based on the third precoding matrix indicator. A rank of the first precoding matrix $W^A$ is the first rank, and a rank of the second precoding matrix $W^B$ is a second rank.

$W^A$ satisfies that $W^A = W_1^A \times W_2^A$. $W^B$ satisfies that $W^B = W_1^B \times W_2^B$. $W^A$ is an $N_t$-row by $R_A$-column matrix, $N_t$ is a quantity of antenna ports of a reference signal sent by the base station, $R_A$ is the first rank, $N_t$ is greater than or equal to $R_A$, $W_1^A$ is an $N_t$-row by 2M-column matrix, $W_2^A$ is a 2M-row by $R_A$-column matrix, $R_A$, M, and $N_t$ are positive integers, and M is greater than or equal to 2. The base station may send data to the terminal device on a first channel by using $W_A$. The base station may send data to the terminal device on a second channel by using $W^B$.

Figure 2:
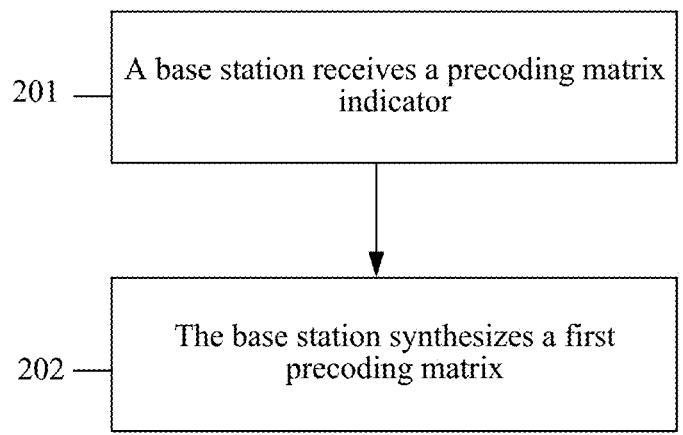
FIG. 2 is a schematic flowchart of synthesizing a precoding matrix on a base station side according to an embodiment of the present disclosure.

Alternatively, the first precoding matrix $W^A$ may be obtained by synthesizing $W_1^A$; or $W^A$ is obtained by synthesizing $W_1^B$. For definitions of $W^A$, $W_1^A$, and $W_1^B$, refer to the foregoing embodiment. $W^A$ may be synthesized by using a method for a Butler matrix. FIG. 2 is a schematic flowchart of synthesizing $W^A$ on a base station side. A process of synthesizing $W^A$ is shown below. A base station in FIG. 2 may be the base station 20 in FIG. 1.

Step 201: The base station receives a precoding matrix indicator.

In step 201, the base station receives the precoding matrix indicator sent by a terminal device. The precoding matrix indicator is used to indicate $W_1^B$, $W_2^B$, and $W_1^A$ that are described above. For example, the base station receives a first precoding matrix indicator and a second precoding matrix indicator. The first precoding matrix indicator is used to indicate $W_1^A$. The second precoding matrix indicator is used to indicate $W_1^B$ and $W_2^B$, or is used to indicate $W^B$, where $W^B = W_1^B \times W_2^B$. Alternatively, the base station receives a third precoding matrix indicator. The third precoding matrix indicator is used to indicate $W_1^A$, $W_1^B$, and $W_2^B$.

Step 202: The base station synthesizes a first precoding matrix.

In step 202, the base station obtains $W_1^A$ and $W_1^B$ based on the precoding matrix indicator.

Optionally, $W^A$ may be obtained by synthesizing $W_1^B$. For example, $$W^A = \frac{1}{\sqrt{N_m}} \sum_{p=1}^{N_m} W_1^B(p) e^{j\omega_m p},$$

where $N_m$ is a quantity of $W_1^B$ for synthesizing the precoding matrix $W^A$, $W_1^B(p)$ is a $p^{th}$ precoding matrix used to synthesize $W^A$, and $\omega_m$ is a real number. Optionally, $\omega_m$ is used to ensure that $W^A$ obtained after synthesis acts on an antenna, that a formed main lobe direction and $W_1^B(p)$ act on the antenna, and that formed main lobe directions are as consistent as possible. $\omega_m$ may be obtained in a traversing manner.

Optionally, $W^A$ may be obtained by synthesizing $W_1^A$. In this case, $$W^A = \frac{1}{\sqrt{N_m}} \sum_{p=1}^{N_m} W_1^A(p) e^{j\omega_m p},$$

where $N_m$ is a quantity of $W_1^A$ for synthesizing the precoding matrix $W^A$, $W_1^A(p)$ is a $p^{th}$ precoding matrix used to synthesize $W^A$, and $\omega_m$ is a real number. Optionally, $\omega_m$ is used to ensure that $W^A$ obtained after synthesis acts on an antenna, that a formed main lobe direction and $W_1^B(p)$ act on the antenna, and that formed main lobe directions are as consistent as possible. $\omega_m$ may be obtained in a traversing manner.

By using a synthesis method, the base station does not need to receive bits of a precoding matrix indicator used to indicate $W_2^A$, thereby reducing a quantity of bits of CSI that is sent by the terminal device and that is received by the base station. Therefore, complexity of the base station is reduced and power consumption is reduced.

Figure 3:
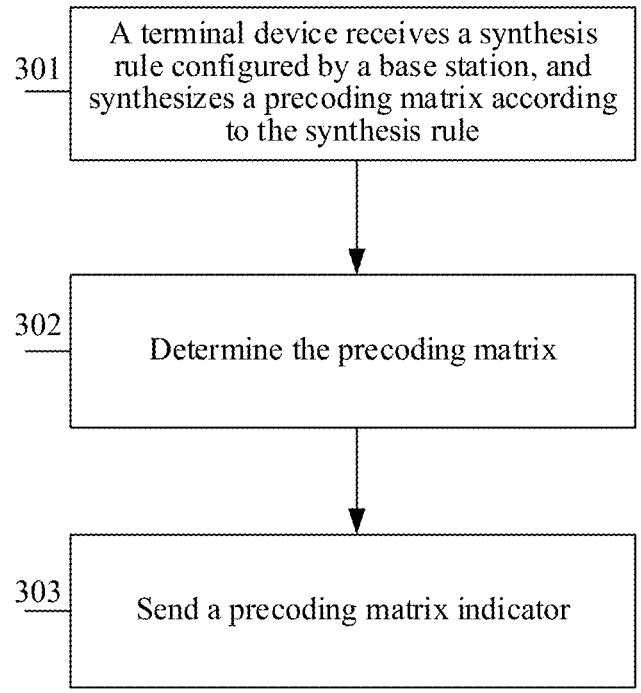
FIG. 3 is a schematic flowchart of synthesizing, by a terminal device, a precoding matrix based on a rule configured by a base station and sending a precoding matrix indicator according to an embodiment of the present disclosure.

To reduce the quantity of bits of the CSI sent by the terminal device, in this embodiment of the present disclosure, on a terminal device side, a method for synthesizing a precoding matrix is provided. The precoding matrix $W^A$ in the first precoding matrix set is a matrix generated according to a first synthesis rule. The first synthesis rule is a predefined rule or a rule configured by the base station. For details of the method for synthesizing a precoding matrix, refer to the foregoing embodiment of the method for synthesizing a precoding matrix on a base station side. Overheads of sending a precoding matrix indicator by the terminal device are reduced by using the synthesis method. FIG. 3 is a schematic flowchart of synthesizing, by a terminal device, a precoding matrix based on a rule configured by a base station and sending a precoding matrix indicator. The terminal device in FIG. 3 may be the terminal device 10 in FIG. 1, including terminal devices 10A and 10B.

Step 301: The terminal device receives a synthesis rule configured by the base station, and synthesizes a precoding matrix according to the synthesis rule.

For a method for synthesizing a precoding matrix according to the synthesis rule, refer to the foregoing embodiment of the method for synthesizing a precoding matrix on a base station side.

Step 302: Determine the precoding matrix and a corresponding precoding matrix indicator.

In step 302, determining the precoding matrix may be determining $W^A$ and $W^B$, or determining $W_1^B$, $W_2^B$, and $W_1^A$.

Moreover, $W^A = W_1^A \times W_2^A$ and $W^B = W_1^B \times W_2^B$. $W_1^A$ corresponds to a first precoding matrix indicator. $W^B$ corresponds to a second precoding matrix indicator, or $W_1^B$ and $W_2^B$ correspond to a second precoding matrix indicator. The precoding matrix indicator corresponding to the precoding matrix may be the first precoding matrix indicator and the second precoding matrix indicator.

Step 303: Send the precoding matrix indicator.

In step 303, the terminal device sends the first precoding matrix indicator and the second precoding matrix indicator. The first precoding matrix indicator is used to indicate $W_1^A$. The second precoding matrix indicator is used to indicate $W_1^B$ and $W_2^B$, or is used to indicate $W^B$, where $W^B = W_1^B \times W_2^B$. By using a synthesis method, the terminal device does not need to send bits a precoding matrix indicator used to indicate $W_2^A$, thereby reducing overheads of feedback performed by the terminal device.

Figure 4:
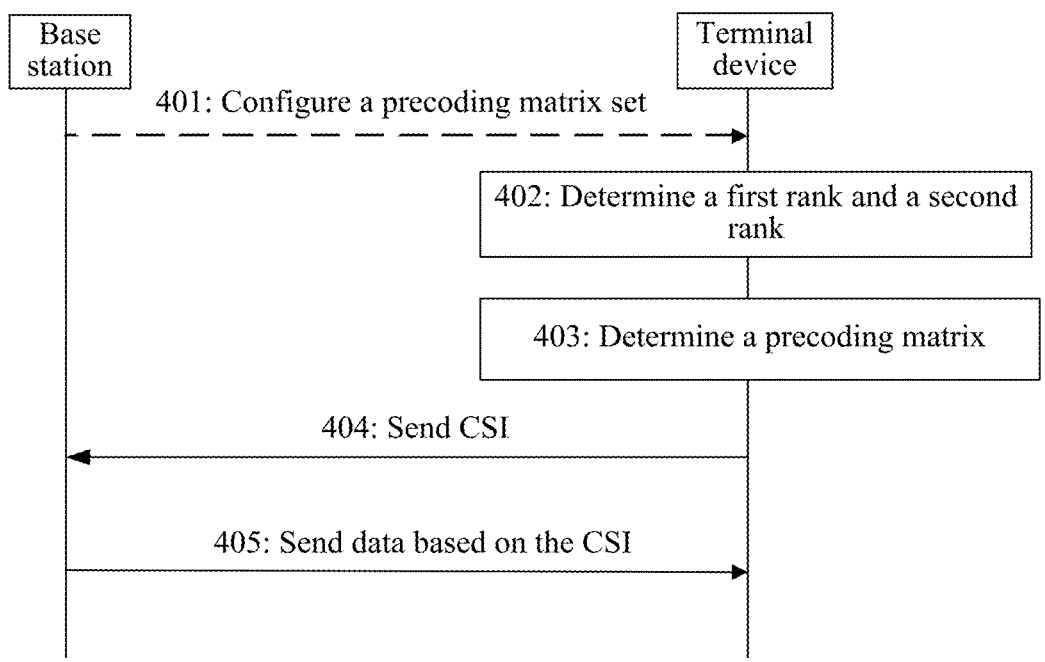
FIG. 4 is a schematic flowchart of a CSI sending method according to an embodiment of the present disclosure.

An embodiment of the present disclosure provides a CSI sending method. FIG. 4 is a schematic diagram of a CSI sending method according to an embodiment of the present disclosure. A base station in FIG. 4 may be the base station 20 in FIG. 1. A terminal device in FIG. 4 may be the terminal device 10 in FIG. 1, namely, the terminal device 10A or the terminal device 10B. As shown in FIG. 4, the method includes the following steps.

Step 401: The base station sends configuration information to the terminal device, where the configuration information is used to configure a precoding matrix set.

Step 401 is an optional step. The base station configures a precoding matrix set for the terminal device. The base station may configure a plurality of precoding matrix sets for the terminal device. One precoding matrix set may include precoding matrices of a plurality of ranks. One rank has a plurality of corresponding precoding matrices. For example, one precoding matrix set includes precoding matrices whose rank is equal to 1, precoding matrices whose rank is equal to 2, precoding matrices whose rank is equal to 3, and precoding matrices whose rank is equal to 4. There are 256 precoding matrices whose rank is equal to 1; there are 256 precoding matrices whose rank is equal to 2; and there are 16 precoding matrices whose rank is equal to 3 and 16 precoding matrices whose rank is equal to 4. Different types of channels have different requirements. For example, some data sent on a common channel is sent to a plurality of terminal devices, and some data is sent to one terminal device. For the data on the common channel sent to the plurality of terminal devices, the base station needs to enable all of the plurality of terminal devices to receive the data on the common channel as correctly as possible. In this case, a main lobe width of a beam sent by the base station is relatively large. Main lobes of the beam sent by the base station can basically cover directions of a plurality of users. For a downlink data channel, for example, a PDSCH, the base station performs sending to one terminal device. When the base station sends the PDSCH, a main lobe direction of a sent beam points, as much as possible, to the terminal device receiving the downlink data, to maximize a signal received power of the terminal device. For a traffic channel, it is required that a beam generated by a precoding matrix is narrow, to centralize energy. For the common channel, a precoding matrix generating a wide beam is required, or a precoding matrix generating a narrow beam is required. However, the common channel has fewer requirements on a quantity of precoding matrices than those of the traffic channel. Therefore, for the common channel and the traffic channel, requirements on a precoding matrix are different.

Considering that the common channel and the traffic channel have different precoding requirements, optionally, the base station configures one precoding matrix set for the common channel, and configures another precoding matrix set for the traffic channel.

Optionally, the base station configures one precoding matrix set for the common channel, and configures E precoding matrix sets for the the traffic channel, which are recorded as a second precoding matrix set, a third precoding matrix set, ..., and an $(E+1)^{th}$ precoding matrix set, where E is a positive integer. For example, in a scenario in which user equipment is higher than a base station, the second precoding matrix set is used on the downlink data channel, and a beam sent upward is generated by a precoding matrix in the precoding matrix set. In a scenario in which user equipment is lower than a base station, the third precoding matrix set is used on the downlink data channel, and a beam sent downward is generated by a precoding matrix in the precoding matrix set.

Optionally, the precoding matrix set is predefined and is not configured by the base station for a terminal. Compared with the configuration of the precoding matrix set for the terminal by the base station, the predefining method can reduce configuration signaling.

Step 402: The terminal device determines a first rank and a second rank.

In step 402, the terminal device determines the first rank used for a first channel and the second rank used for a second channel. A rank is an amount of data spatial multiplexing, which is equal to a quantity of columns of the precoding matrix. One rank corresponds to one rank indicator. A rank indicator is used to indicate a rank. The terminal device sends a rank indicator to the base station to indicate a quantity of columns of a precoding matrix that is used by the base station and that is expected by the terminal device. For example, a value of a rank ranges from 1 to 8, and a rank indicator is represented by using three bits. When the rank indicator is 000, it indicates that the rank is 1. When the rank indicator is 001, it indicates that the rank is 2. The rest can be deduced by analogy. In conclusion, if a value is assigned to a rank, there is a rank indicator corresponding to the rank.

The first channel may be a common channel, for example, a common control channel. The second channel may be a downlink traffic channel, for example, a PDSCH. The first rank used for the first channel means that the first rank is for the first channel. For example, an objective of determining the first rank by the terminal device is to determine a rank of a precoding matrix used by the base station or a quantity of columns of the precoding matrix. After the terminal device notifies the base station of the first rank by using a first rank indicator, the base station performs precoding on data on the first channel by using a precoding matrix whose rank is equal to the first rank. Similarly, a function of the second rank used for the second channel can be obtained.

Optionally, the terminal device may determine the rank based on information such as CSI. Optionally, the base station sends a cell-specific reference signal (CRS) or a channel state information reference signal (CSI-RS) to the terminal device. The terminal device obtains a downlink channel estimation and a downlink interference estimation based on the CRS or the CSI-RS, and then determines, based on the downlink channel estimation and the downlink interference estimation, a rank expected by the terminal device during downlink transmission. A method for determining a rank by the terminal device is provided below by using an example in which the terminal device receives a PDSCH in an LTE system.

The terminal device receives the PDSCH and a reference signal. On a subcarrier, a mathematical model for receiving the PDSCH signal by the terminal device is as follows:

$$y = HWs + n \quad (1)$$

where y is a vector for receiving the PDSCH signal, H is a channel matrix obtained by using the reference signal, W is a precoding matrix, S is a transmitting symbol vector, and n is interference plus noise obtained by using the reference signal.

The terminal device traverses all ranks and all precoding matrices corresponding to each rank, and calculates a channel capacity that is of each precoding matrix and that is obtained after precoding. Each precoding matrix has one channel capacity. The channel capacity may be a quantity of bits that can be correctly sent by a transmit end. A precoding matrix corresponding to a maximum channel capacity and a rank of the precoding matrix are obtained. In addition, a CQI may further be obtained based on the precoding matrix. For example, a ratio of a detected signal to the interference plus noise is obtained based on the precoding matrix, to serve as the CQI.

When the rank is determined, a method for determining the precoding matrix expected by the terminal device is as follows: For example, the terminal device needs to send a precoding matrix indicator in a subframe. Before that, a rank indicator has been sent. The terminal device needs to traverse only a precoding matrix set of a rank indicated by the rank indicator. For example, if the rank corresponding to the rank indicator is 1, the terminal device needs to traverse only a precoding matrix set whose rank is equal to 1, to obtain a precoding matrix enabling a maximum channel capacity. In addition, the CQI may further be obtained based on the precoding matrix.

When traversing a precoding matrix corresponding to a rank, the terminal device may obtain the precoding matrix by using a precoding matrix indicator. For example, the precoding matrix indicator is traversed. When a precoding matrix indicator is traversed, a precoding matrix is obtained based on the precoding matrix indicator, and the channel capacity is calculated based on the precoding matrix. Alternatively, the precoding matrix may be directly traversed. After the precoding matrix enabling the maximum channel capacity is selected, the precoding matrix indicator is obtained based on a one-to-one correspondence between a precoding matrix and a precoding matrix indicator.

The foregoing merely provides a rank determining method. It should be understood that, the terminal device may determine a rank by using other methods known by a person skilled in the art. For brevity, details are not described herein.

The first rank corresponds to a rank of a first precoding matrix of the first channel, and the first rank is indicated by the first rank indicator. The second rank corresponds to a rank of a second precoding matrix of the second channel, and the second rank is indicated by a second rank indicator. A channel type of the first channel is different from a channel type of the second channel. The first channel may be a common channel, for example, a common control channel. The second channel may be a downlink traffic channel, for example, a PDSCH. Different types of channels have different requirements. Therefore, for a type of channels, using a precoding matrix set satisfying a requirement of the type of channels can improve performance.

Step 403: The terminal device determines a precoding matrix.

In step 403, the terminal device determines the first precoding matrix in a first precoding matrix set corresponding to the first rank, and determines the second precoding matrix in a second precoding matrix set corresponding to the second rank; and the first precoding matrix is indicated by a first precoding matrix indicator, and the second precoding matrix is indicated by a second precoding matrix indicator. The first precoding matrix set is different from the second precoding matrix set. In this way, different precoding matrix sets may be used for the requirements of the first channel and the second channel. Moreover, the first precoding matrix set is optimally designed for the first channel, and the second precoding matrix is optimally designed for the second channel. Therefore, the performance can be improved. The first precoding matrix set being different from the second precoding matrix set means that precoding matrices included in the two precoding matrix sets are not completely the same. Alternatively, the first precoding matrix set being different from the second precoding matrix set means that there is at least one rank, and a precoding matrix corresponding to the rank in the first precoding matrix set and a precoding matrix corresponding to the rank in the second precoding matrix set are not completely the same. For example, the first precoding matrix set includes eight precoding matrices whose rank is equal to 1, and the second precoding matrix set includes eight precoding matrices whose rank is equal to 1. Four precoding matrices of the precoding matrices whose rank is equal to 1 in the first precoding matrix set and four precoding matrices of the precoding matrices whose rank is equal to 1 in the second precoding matrix set are the same. However, the other four precoding matrices whose rank is equal to 1 in the first precoding matrix set are not in the precoding matrices whose rank is equal to 1 in the second precoding matrix set. In this case, the first precoding matrix set is different from the second precoding matrix set.

Alternatively, in step 403, the terminal device determines the first precoding matrix in the first precoding matrix set corresponding to the first rank, and determines the second precoding matrix in the second precoding matrix set corresponding to the second rank; and the first precoding matrix and the second precoding matrix are indicated by a third precoding matrix indicator. The first precoding matrix set is different from the second precoding matrix set. For example, the third precoding matrix indicator includes eight bits, and the eight bits not only indicate the first precoding matrix in the first precoding matrix set, but also indicate the second precoding matrix in the second precoding matrix set. Therefore, overheads required for feeding back a precoding matrix indicator by the terminal device can be reduced.

If the first precoding matrix is indicated by the first precoding matrix indicator and the second precoding matrix is indicated by the second precoding matrix indicator, optionally, the first precoding matrix indicator is represented by $B_1$ bits and the second precoding matrix indicator is represented by $B_2$ bits. The $B_1$ bits and the $B_2$ bits are partially overlapped, and $B_1$ and $B_2$ are positive integers. The first precoding matrix indicator and the second precoding matrix indicator have common bits. Therefore, the overheads required for feeding back a precoding matrix indicator by the terminal device can be reduced. For example, there are 12 bits in total representing the first precoding matrix indicator and the second precoding matrix indicator. In the 12 bits, the first to the eighth bits belong to the first precoding matrix indicator; and the first to the fourth bits, and the ninth to the twelfth bits belong to the second precoding matrix indicator. There are 4 bits of precoding matrix indicators shared by the first precoding matrix and the second precoding matrix, thereby reducing overheads required for feeding back a precoding matrix indicator by the terminal device.

If the first precoding matrix is indicated by the first precoding matrix indicator and the second precoding matrix is indicated by the second precoding matrix indicator, or if the first precoding matrix and the second precoding matrix are indicated by the third precoding matrix indicator, there are further the following optional designs.

Optionally, the first precoding matrix is $W^A$ and $W^A = W_1^A \times W_2^A$, where $W^A$ is an $N_t$-row by $R_A$-column matrix, $N_t$ is a quantity of antenna ports of a reference signal sent by the base station, $R_A$ is the first rank, $N_t$ is greater than or equal to $R_A$, $W_1^A$ is an $N_t$-row by 2M-column matrix, $W_2^A$ is a 2M-row by $R_A$-column matrix, $R_A$, M, and $N_t$ are positive integers, and M is greater than or equal to 2; and the second precoding matrix is $W^B$ and $W^B=W_1^B \times W_2^B$, where $W^B$ is an $N_t$-row by $R_B$-column matrix, $R_B$ is the second rank, $W_1^B$ is an $N_t$-row by 2K-column matrix, $W_2^B$ is a 2K-row by $R_B$-column matrix, and $R_B$ and K are positive integers.

Optionally, K is less than or equal to M, and 2M columns in $W_1^A$ include each column in $W_1^B$. For example, $W_1^A$ includes 16 column vectors (that is, $W_1^A$ has 16 columns), and $W_1^B$ includes 8 column vectors. The 16 column vectors in $W_1^A$ include the 8 column vectors in $W_1^B$.

Based on a relationship between $W_1^A$ of the first channel and $W_1^B$ of the second channel, $W_1^A$ may include a vector used to generate a beam covering an entire cell, or may include a vector used to generate a particular direction pointed by a main lobe direction. The beam that is generated by the vector and that covers the entire cell is a wide beam. The vector whose main lobe direction points to the particular direction generates a narrow beam. Using an example in which the first channel is a common channel and the second channel is a downlink data channel, for a data channel, the vector whose main lobe direction points to the particular direction in $W_1^A$ may be included in $W_1^B$. Vectors in $W_1^A$ of the common channel and vectors in $W_1^B$ of the downlink data channel have a containing relationship. Therefore, a quantity of bits required for feeding back a precoding matrix indicator can be reduced while satisfying requirements of the common channel and the downlink data channel.

Optionally, each precoding matrix $W^1$ in the first precoding matrix set satisfies that $W^1=W_1^1 \times W_2^1$, where $W^1$ is an $N_t$-row by $R_A$-column matrix, $N_t$ is the quantity of antenna ports, $R_A$ is the first rank, $N_t$ is greater than or equal to $R_A$, $W_1^1$ is an $N_t$-row by 2M-column matrix, $W_2^1$ is a 2M-row by $R_A$-column matrix, $N_t$, $R_A$, and M are positive integers, and M is greater than or equal to 2. Each precoding matrix in the second precoding matrix set satisfies that $W^2=W_1^2 \times W_2^2$, where is an $N_t$-row by $R_B$-column matrix, $R_B$ is the second rank, $N_t$ is greater than or equal to $R_B$, $W_1^2$ is an $N_t$-row by 2K-column matrix, $W_2^2$ is a 2K-row by $R_B$-column matrix, and $R_B$ and K are positive integers.

Optionally, K is less than or equal to M, a random $W_1^1$ in the first precoding matrix set corresponds to $W_1^2$ in the second precoding matrix set, and 2M columns in a random $W_1^1$ in the first precoding set include each column in $W_1^2$ that is in the second precoding matrix set and that corresponds to the random $W_1^1$ in the first precoding set.

Optionally, $N_t$ is an even number.

Optionally, $$W_1^1 = \begin{bmatrix} X_1 & 0 \\ 0 & X_1 \end{bmatrix},$$

where $X^1$ is an $N_t/2$-row by M-column matrix, and $N_t$ is an even number. $X_1=[v_0 \ldots v_{M-1}]$, where $v_d$ is a column vector including $N_t/2$ elements, and d is an integer ranging from 0 to M−1.

A random column in $W_2^1$ is represented by $$\begin{bmatrix} e_l \\ \phi_n e_l \end{bmatrix},$$

where $\phi_n$ is a complex number, $e_l$ is an M×1 column vector, an $l^{th}$ element of $e_l$ is 1, the remaining elements are 0, and l is an integer ranging from 1 to M. $e_l$ is a column selection matrix, selecting one column in $X_1$. A function of $e_l$ is to select a precoding vector. A function of $\phi_n$ is to perform phase weighting between two groups of antennas (which are usually two groups of polarization antennas). For example, eight antenna ports are divided into two polarization directions: 45 degrees of polarization and −45 degrees of polarization. Each polarization direction has four antenna ports. The first $N_t/2$ rows of a precoding matrix W correspond to precoding weighting of antenna ports in one polarization direction, and the last $N_t/2$ rows correspond to precoding weighting of antenna ports in the other polarization direction.

Optionally, $$W_1^2 = \begin{bmatrix} X_2 & 0 \\ 0 & X_2 \end{bmatrix},$$

where $X_2$ is an $N_t/2$-row by K-column matrix, and $N_t$ is an even number. $X_2=[z_0 \ldots z_{k-1}]$, where $z_d$ is a column vector including $N_t/2$ elements, and d is an integer ranging from 0 to K−1.

A random column in $W_2^2$ is represented by $$\begin{bmatrix} e_m \\ \phi_k e_m \end{bmatrix},$$

where $\phi_k$ is a complex number, $e_m$ is a K×1 column vector, an $m^{th}$ element of $e_m$ is 1, the remaining elements are 0, and m is an integer ranging from 1 to K. $e_l$ is a column selection matrix, selecting one column in $X_2$. A function of $e_m$ is to select a precoding vector. A function of $\phi_n$ is to perform phase weighting between two groups of antennas (which are usually two groups of polarization antennas).

A reason for which the foregoing structures are used for $W_1^1$, $W_1^2$, $W_2^1$, and $W_2^2$ is mainly that currently applied antenna arrays are mainly dual-polarized antenna arrays. The foregoing precoding matrix structures can enable beam directions of antennas in two polarization directions to be the same. This relatively well matches a channel feature of a dual-polarized antenna array. Therefore, desirable performance can be achieved by using the foregoing precoding matrix structures.

Using a precoding matrix having 8 antenna ports as an example, the first precoding matrix set of a rank 1 to a rank 4 is described as follows: It is set that $W=W^A$, $W_1=W_1^A$, and $W_2=W_2^A$. A random precoding matrix in the first precoding matrix set of the rank 1 to the rank 4 satisfies that $W=W_1 \times W_2$.

$W_1$ is applicable to an entire system bandwidth, and has a feature of a long period. A slowing varying/sub-band feature of a channel is embodied in $W_2$. $W_2$ is applicable to feedback of each sub-band, and has a feature of a short period.

(1) A precoding matrix set whose rank is equal to 1 or 2 is shown as follows:

A matrix B is defined as shown in a formula (2), and the matrix B has 32 column vectors.

$$B = [b_0 \; b_1 \; \ldots \; b_{31}], [B]_{1+m, 1+n} = e^{j\frac{2\pi mn}{32}}, \quad (2)$$

$m = 0, 1, 2, 3, n = 0, 1, \ldots, 31$

In (2), $b_g$ (g=0, ..., and 31) is a column vector in B. $X_{(k)}$ is also defined as shown as follows:

$$X(k) \in \{[b_{2k \bmod 32} \quad b_{(2k+1) \bmod 32} \quad b_{(2k+2) \bmod 32} \quad b_{(2k+3) \bmod 32}] : k=0,1,\ldots,15\} \quad (3)$$

One $X^{(k)}$ (k=0, ..., and 15) has 4 vectors in the matrix B. There are 16 $X^{(k)}$ in total. All vectors in the 16 $X^{(k)}$ are the 32 vectors in the matrix B.

For the rank 1 and the rank 2, a representation form of $W_1$ is a block diagonal matrix, each sub-block matrix corresponds to one polarization direction, that is $$W_1 = \begin{bmatrix} X_1 & 0 \\ 0 & X_1 \end{bmatrix}, X_1 = X^{(k)} \quad (4)$$

Column vectors in $X_1$ belong to the column vectors in the matrix B. The column vectors in $X_1$ may have a beam forming function when acting on antenna ports in one polarization direction. One diagonal block $X_1$ in $W_1$ is used for one polarization direction, and the other diagonal block $X_1$ is used for the other polarization direction.

When the rank is equal to 1, $$W_2 \in C_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\} \quad (5)$$

where $Y \in \{\tilde{e}_1, \tilde{e}_2, \tilde{e}_3, \tilde{e}_4\}$.

When the rank is equal to 2, $$W_2 \in C_2 = \left\{ \frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ jY_1 & -jY_2 \end{bmatrix} \right\} \quad (6)$$

where $(Y_1, Y_2) \in \{(\tilde{e}_1, \tilde{e}_1), (\tilde{e}_2, \tilde{e}_2), (\tilde{e}_3, \tilde{e}_3),$
$(\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$.

$\tilde{e}_q$ represents a selection column vector, an $n^{th}$ element of $\tilde{e}_q$ is 1, and the remaining elements are 0. When the rank is equal to 1 or 2, $\tilde{e}_q$ is a 4-row by 1-column vector, and q is an integer ranging from 1 to 4.

(2) Precoding matrix sets whose ranks are equal to 3 and 4 are shown as follows:

For the rank 3 and the rank 4, the matrix B is defined as shown as follows:

$$B = [b_0 \quad b_1 \quad \ldots \quad b_{15}], [B]_{1+m,1+n} = e^{j\frac{2\pi mn}{16}}, \quad (7)$$
$$m = 0,1,2,3, n = 0,1,\ldots,15$$

The matrix B has 16 column vectors, and $b_g$ (g=0, ..., and 15) is a column vector in B. $X^{(k)}$ (k=0, ..., and 3) is also defined. Each $X^{(k)}$ has 8 vectors, and $X^{(k)}$ is shown as follows:

$$X^{(k)} \in \{[b_{4k \bmod 16} \quad b_{(4k+1) \bmod 16} \quad \ldots \quad b_{(4k+7) \bmod 16}] : k=0,1,2,3\} \quad (8)$$

For the ranks equal to 3 and 4, $W_1$ satisfies that $$W_1 = \begin{bmatrix} X^{(k)} & 0 \\ 0 & X^{(k)} \end{bmatrix}.$$

When the rank is equal to 3, $$W_2 \in C_2 = \left\{ \frac{1}{\sqrt{2}}\begin{bmatrix} Y_1 & Y_2 \\ Y_1 & -Y_2 \end{bmatrix} \right\} \quad (9)$$

where $(Y_1, Y_2) \in$ \quad (10)

$\{(e_1, [e_1 \quad e_5]), (e_2, [e_2 \quad e_6]), (e_3, [e_3 \quad e_7]), (e_4, [e_4 \quad e_8]),$
$(e_5, [e_1 \quad e_5]), (e_6, [e_2 \quad e_6]), (e_7, [e_3 \quad e_7]), (e_8, [e_4 \quad e_8]),$
$([e_1 \quad e_5], e_5), ([e_2 \quad e_6], e_6), ([e_3 \quad e_7], e_7), ([e_4 \quad e_8], e_8),$
$([e_5 \quad e_1], e_1), ([e_6 \quad e_2], e_2), ([e_7 \quad e_3], e_3), ([e_8 \quad e_4], e_4)\}$ When the rank is equal to 4, $$W_2 \in C_2 = \left\{ \frac{1}{\sqrt{2}}\begin{bmatrix} Y & Y \\ Y & -Y \end{bmatrix}, \frac{1}{\sqrt{2}}\begin{bmatrix} Y & Y \\ jY & -jY \end{bmatrix} \right\} \quad (11)$$

where $$Y \in \{[e_1 \quad e_5], [e_2 \quad e_6], [e_3 \quad e_7], [e_4 \quad e_8]\} \quad (12)$$

where $e_p$ is a 4×1 column vector, a $p^{th}$ element of $e_p$ is 1, the remaining elements are 0, and p is an integer ranging from 1 to 8.

Optionally, the first precoding matrix $W^A$ is an $N_t$-row by $R_A$-column matrix.

Optionally, the second precoding matrix is $W^B$, and is an $N_t$-row by $R_B$-column matrix.

Optionally, the precoding matrix sets and/or a quantity of the precoding matrix sets are configured, for the terminal device, based on a configuration parameter sent by the base station.

The base station configures a plurality of precoding matrix sets for a user. Each precoding matrix W in each precoding matrix set satisfies that $W=W_1 \times W_2$. For example, the base station configures 3 precoding matrix sets, which are recorded as a precoding matrix set 1, a precoding matrix set 2, and a precoding matrix set 3. A precoding matrix $W^1$ in the precoding matrix set 1 satisfies that $W^1=W_1^1 \times W_2^1$; a precoding matrix $W^2$ in the precoding matrix set 2 satisfies that $W^2=W_1^2 \times W_2^2$; and a precoding matrix $W^3$ in the precoding matrix set 3 satisfies that $W^3=W_1^3 \times W_2^3$ includes 16 column vectors, $W_1^2$ includes 8 column vectors, and $W_1^3$ includes 4 column vectors. The 16 column vectors in $W_1^2$ include the 8 column vectors in $W_1^2$; and the 8 column vectors in $W_1^2$ include the 4 column vectors in $W_1^3$.

That the base station configures different precoding matrix sets for terminal users can implement inter-cell interference coordination. For example, when coverage is satisfied and inter-cell interference is severe, the base station may configure the precoding matrix set 1 for a cell edge user (for example, a precoding matrix whose beam is relatively wide), thereby implementing the inter-cell interference coordination.

Step 404: The terminal device sends CSI to the base station.

In step 404, the CSI includes the first rank indicator, the second rank indicator, the first precoding matrix indicator, and the second precoding matrix indicator.

Alternatively, in step 404, the first rank indicator is a predefined value, and the CSI includes the second rank indicator, the first precoding matrix indicator, and the second precoding matrix indicator. In this case, the first rank is a predefined value. The base station and the terminal device have consistent understanding on a value of a rank. In this case, user equipment does not need to send a rank indicator to the base station. A rank indicator corresponding to the first rank does not need to be fed back. Therefore, overheads required for feeding back the first rank by the terminal device can be reduced. An objective of sending the first precoding matrix indicator by the terminal device is that the base station performs precoding on data of the first channel by using the first precoding matrix $W^A$. An objective of sending the second precoding matrix indicator by the terminal device is that the base station performs precoding on data of the second channel by using the second precoding matrix $W^B$.

Optionally, if the first precoding matrix and the second precoding matrix are indicated by the third precoding matrix indicator, in step 404, the CSI may include the first rank indicator, the second rank indicator, and the third precoding matrix indicator. Alternatively, the first rank indicator is a predefined value, and the CSI includes the second rank indicator and the third precoding matrix indicator.

In this embodiment of the present disclosure, the CSI may further include a second CQI, and the second CQI is obtained based on the second precoding matrix. Alternatively, the CSI may further include a first CQI and a second CQI, the first CQI is obtained based on the first precoding matrix, and the second CQI is obtained based on the second precoding matrix.

When the CSI includes the first CQI and the second CQI, optionally, the user equipment feeds back the first CQI and the second CQI based on different feedback modes.

For example, the first CQI and the second CQI are fed back based on a same feedback mode, and are fed back on a PUSCH. A CQI of each sub-band is fed back based on a same mode. The first CQI and the second CQI may alternatively be fed back based on different feedback modes. For example, the first CQI is fed back on a PUSCH, and the second CQI is fed back on a PUCCH. Feedback modes of a rank indicator and a precoding matrix indicator are the same as a feedback mode of a CQI. Therefore, the first rank indicator and the second rank indicator may also be fed back based on a same mode or based on different modes. The first precoding matrix indicator and the second precoding matrix indicator may also be fed back based on a same mode or based on different modes. Adaptation of CSI information obtaining or feedback in different scenarios can be implemented in the foregoing CSI feedback manner, thereby improving system performance.

When the CSI includes the first CQI and the second CQI, optionally, the first CQI and the second CQI correspond to a same frequency domain resource. That the first CQI and the second CQI correspond to a same frequency domain resource means that the first CQI and the second CQI are obtained for a same frequency domain resource. For example, a system bandwidth is divided into 10 sub-bands, each sub-band has 5 physical resource blocks (physical resource block, PRB), and each physical resource block occupies 180000 Hertz in frequency domain. The 10 sub-bands are a sub-band 1, a sub-band 2, a sub-band 3, . . . , and a sub-band 10. A CQI for a sub-band is a sub-band CQI. A CQI for the entire system bandwidth is a broadband CQI. The first CQI and the second CQI are CQIs of one same sub-band of the sub-bands, for example, are CQIs of the sub-band 1. Alternatively, the first CQI and the second CQI are broadband CQIs. When the two CQIs correspond to a same frequency domain resource, overheads required for feeding back a CQI can be reduced by using a channel feature of the first channel and a channel feature of the second channel.

When the CSI includes the first CQI and the second CQI, optionally, the first CQI and the second CQI are represented in a differential manner. Therefore, the overheads required for feeding back a CQI can be reduced.

When the CSI includes the first CQI and the second CQI, optionally, a precoding matrix set based on which the first CQI and the second CQI are obtained is configurable. For example, there are T (T>2) precoding matrix sets. Assuming that T=10, the base station configures that the terminal device obtains the first CQI based on a precoding matrix in a fourth precoding matrix set; and the base station configures that the terminal device obtains the second CQI based on a precoding matrix in an eighth precoding matrix set. The base station may configure any one of the T precoding matrix sets for the terminal device to obtain the first CQI. Similarly, the base station may configure any one of the T precoding matrix sets for the terminal device to obtain the second CQI. The base station may configure a precoding matrix set based on a channel condition, to obtain desirable performance.

Optionally, an index of a precoding matrix set based on which the first CQI is obtained is notified by the base station to the user equipment.

Optionally, an index of a precoding matrix set based on which the second CQI is obtained may also be notified by the base station to the user equipment.

The base station receives the CSI sent by the terminal device.

Optionally, the base station may obtain $W_A$ based on the CSI and a method for synthesizing a precoding matrix. For details of the method, refer to the foregoing embodiment.

Step 405: The base station sends data based on the CSI.

Optionally, in step 405, when the CSI includes the first rank indicator, the second rank indicator, the first precoding matrix indicator, and the second precoding matrix indicator; or when the first rank indicator is a predefined value, and the CSI includes the second rank indicator, the first precoding matrix indicator, and the second precoding matrix indicator, the base station determines the first precoding matrix based on the first precoding matrix indicator, and determines the second precoding matrix based on the second precoding matrix indicator. In addition, a rank of the first precoding matrix is the first rank, and a rank of the second precoding matrix is the second rank. The base station may perform precoding on data on the first channel by using the first precoding matrix, or may perform precoding on data based on another precoding matrix that is obtained after transformation based on the precoding matrix, for example, by considering a zero forcing algorithm of a transmit end between multi-user MIMO. Similarly, the base station may perform precoding on data on the second channel by using the second precoding matrix, or may perform precoding on data based on another precoding matrix that is obtained after transformation based on the precoding matrix, for example, by considering a zero forcing algorithm of a transmit end between multi-user MIMO.

When the CSI includes the first rank indicator, the second rank indicator, and the third precoding matrix indicator; or when the first rank indicator is a predefined value, and the CSI includes the second rank indicator and the third precoding matrix indicator, the base station determines the first precoding matrix and the second precoding matrix based on the third precoding matrix indicator. For how to perform precoding on data by using the first precoding matrix and the second precoding matrix, refer to the foregoing embodiments. Details are not described herein again.

When the CSI further includes the second CQI, the base station may determine, based on the second CQI, a modulation scheme in which data is sent on the second channel. When the CSI further includes the first CQI, the base station may determine, based on the first CQI, a modulation scheme in which data is sent on the first channel.

Therefore, according to the CSI sending method in this embodiment of the present disclosure, different precoding matrix sets are used for the common channel and the traffic channel to obtain the CSI. Overheads required for feeding back a precoding matrix indicator are reduced while satisfying requirements of the common channel and the traffic channel.

The method according to the embodiments of the present disclosure are described in detail above with reference to FIG. 4, and terminal devices and base stations according to the embodiments of the present disclosure are described in detail below with reference to FIG. 5 to FIG. 8.

Figure 5:
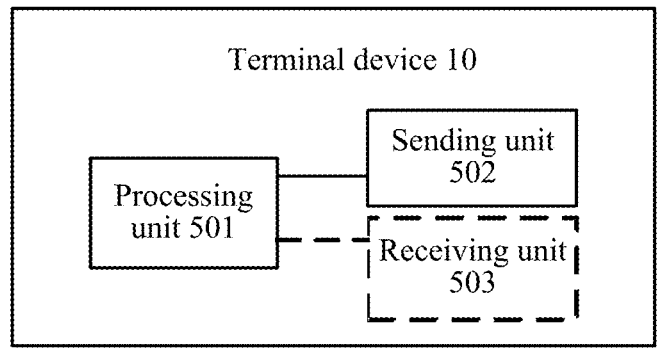
FIG. 5 is a schematic block diagram of a terminal device according to an embodiment of the present disclosure.

As shown in FIG. 5, an embodiment of the present disclosure provides a terminal device 10 as that shown in FIG. 1, which may be 10A or 10B. The terminal device 10 includes:

a processing unit 501, configured to determine a first rank used for a first channel and a second rank used for a second channel, where the first rank is indicated by a first rank indicator, the second rank is indicated by a second rank indicator, and a channel type of the first channel is different from a channel type of the second channel, where the processing unit 501 is further configured to: determine a first precoding matrix in a first precoding matrix set, and determine a second precoding matrix in a second precoding matrix set, where the first precoding matrix set is different from the second precoding matrix set, a rank of the first precoding matrix is the first rank, the first precoding matrix is indicated by a first precoding matrix indicator, a rank of the second precoding matrix is the second rank, and the second precoding matrix is indicated by a second precoding matrix indicator; and a sending unit 502, configured to send the first rank indicator, the second rank indicator, the first precoding matrix indicator, and the second precoding matrix indicator; or configured to send the second rank indicator, the first precoding matrix indicator, and the second precoding matrix indicator, where the first rank indicator is a predefined value.

Optionally, the first channel is a common channel, and the second channel is a traffic channel. The sending unit is further configured to send a second CQI to a base station, where the second CQI is obtained based on the second precoding matrix; or the sending unit is further configured to send a first CQI and a second CQI to a base station, where the first CQI is obtained based on the first precoding matrix, and the second CQI is obtained based on the second precoding matrix.

For further descriptions of the first rank indicator, the first rank, the second rank indicator, the second rank, the first precoding matrix indicator, the second precoding matrix indicator, the third precoding matrix indicator, the first precoding matrix $W^A$, the second precoding matrix $W^B$, and the like, refer to the descriptions of the method embodiments of the present disclosure. For specific implementation of the processing unit of the terminal device, refer to the specific implementation of the terminal device in the foregoing method embodiments.

Therefore, according to the terminal device for sending CSI in this embodiment of the present disclosure, different precoding matrix sets are used for the common channel and the traffic channel to obtain the CSI. Overheads required for feeding back a precoding matrix indicator are reduced while satisfying requirements of the common channel and the traffic channel.

Figure 6:
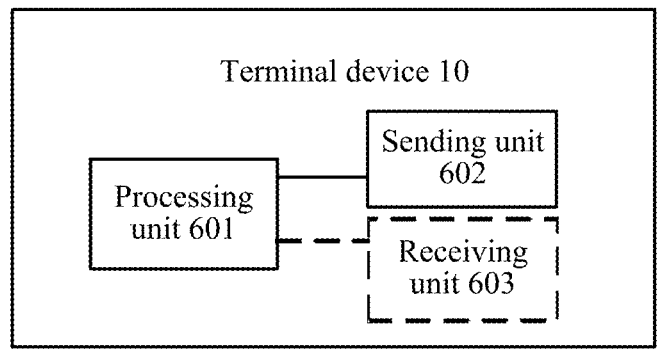
FIG. 6 is another schematic block diagram of user equipment according to an embodiment of the present disclosure.

As shown in FIG. 6, an embodiment of the present disclosure further provides a terminal device 10 as that shown in FIG. 1, which may be 10A or 10B. The terminal device 10 includes:

a processing unit 601, configured to determine a first rank used for a first channel and a second rank used for a second channel, where the first rank is indicated by a first rank indicator, the second rank is indicated by a second rank indicator, and a channel type of the first channel is different from a channel type of the second channel, where the processing unit is further configured to: determine a first precoding matrix in a first precoding matrix set, and determine a second precoding matrix in a second precoding matrix set, where the first precoding matrix set is different from the second precoding matrix set, a rank of the first precoding matrix is the first rank, a rank of the second precoding matrix is the second rank, and the first precoding matrix and the second precoding matrix are indicated by a third precoding matrix indicator; and a sending unit 602, configured to send the first rank indicator, the second rank indicator, and the third precoding matrix indicator; or configured to send the second rank indicator and the third precoding matrix indicator, where the first rank indicator is a predefined value.

For further descriptions of the first rank indicator, the first rank, the second rank indicator, the second rank, the first precoding matrix indicator, the second precoding matrix indicator, the third precoding matrix indicator, the first precoding matrix $W^A$, the second precoding matrix $W^B$, and the like, refer to the descriptions of the method embodiments of the present disclosure. For specific implementation of the processing unit of the terminal device, refer to the specific implementation of the terminal device in the foregoing method embodiments.

Therefore, according to the terminal device for sending CSI in this embodiment of the present disclosure, different precoding matrix sets are used for the common channel and the traffic channel to obtain the CSI. Overheads required for feeding back a precoding matrix indicator are reduced while satisfying requirements of the common channel and the traffic channel.

Figure 7:
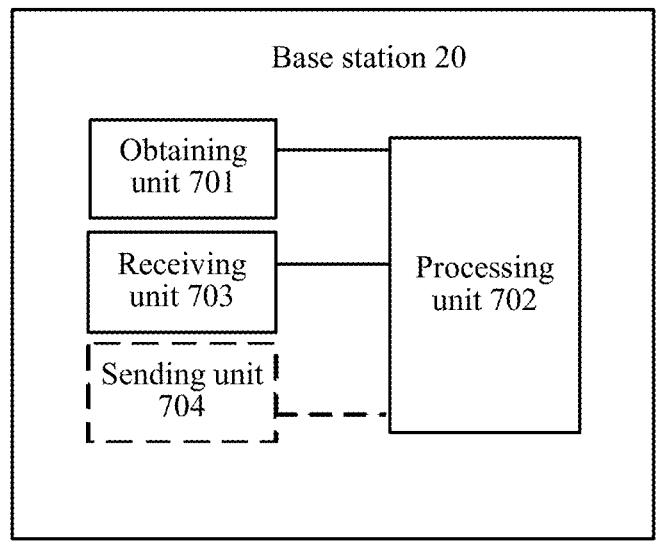
FIG. 7 is a schematic block diagram of a base station according to an embodiment of the present disclosure.

As shown in FIG. 7, an embodiment of the present disclosure provides a base station 20 as that shown in FIG. 1. The base station 20 includes:

an obtaining unit 701, configured to obtain a first rank indicator, a second rank indicator, a first precoding matrix indicator, and a second precoding matrix indicator, where the first precoding matrix indicator, the second precoding matrix indicator, and the second rank indicator are obtained from a terminal device, and the first rank indicator is obtained from the terminal device or the first rank indicator is a predefined value; and a processing unit 702, configured to determine a first rank based on the first rank indicator, determine a second rank based on the second rank indicator, determine a first precoding matrix based on the first precoding matrix indicator, and determine a second precoding matrix based on the second precoding matrix indicator.

The first rank is used for a first channel, the second rank is used for a second channel, and a channel type of the first channel is different from a channel type of the second channel.

A rank of the first precoding matrix is the first rank, and the first precoding matrix is in a first precoding matrix set.

A rank of the second precoding matrix is the second rank, and the second precoding matrix is in a second precoding matrix set.

The first precoding matrix set is different from the second precoding matrix set.

For further descriptions of the first rank indicator, the first rank, the second rank indicator, the second rank, the first precoding matrix indicator, the second precoding matrix indicator, the third precoding matrix indicator, the first precoding matrix $W^A$, the second precoding matrix $W^B$, and the like, refer to the descriptions of the method embodiments of the present disclosure. For specific implementation of the processing unit of the base station, refer to the specific implementation of the base station in the foregoing method embodiments.

Therefore, according to the base station for receiving CSI in this embodiment of the present disclosure, different precoding matrix sets are used for the common channel and the traffic channel to obtain the CSI. Overheads of a precoding matrix indicator are reduced while satisfying requirements of the common channel and the traffic channel.

Figure 8:
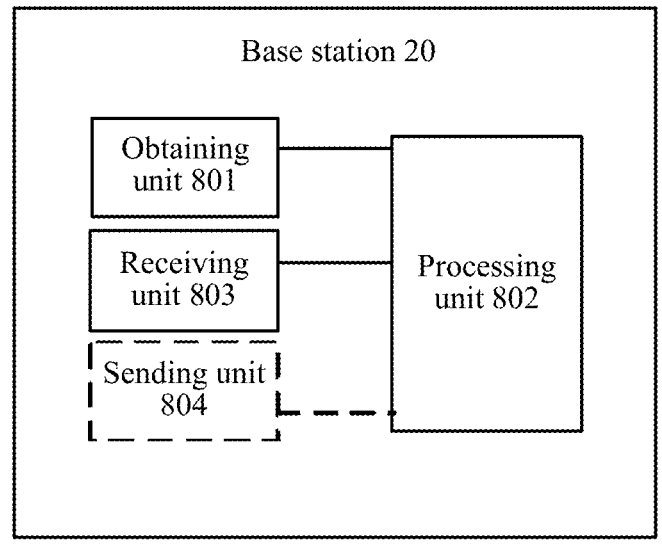
FIG. 8 is another schematic block diagram of a base station according to an embodiment of the present disclosure.

As shown in FIG. 8, an embodiment of the present disclosure further provides a base station 20 as that shown in FIG. 1. The base station 20 includes:

an obtaining unit 801, configured to obtain a first rank indicator, a second rank indicator, a first precoding matrix indicator, and a second precoding matrix indicator, where the first precoding matrix indicator, the second precoding matrix indicator, and the second rank indicator are obtained from a terminal device, and the first rank indicator is obtained from the terminal device or the first rank indicator is a predefined value; and where the first rank indicator is used to indicate a first rank, the second rank indicator is used to indicate a second rank, the first rank is used for a first channel, the second rank is used for a second channel, and a channel type of the first channel is different from a channel type of the second channel.

A third precoding matrix indicator is used to indicate a first precoding matrix and a second precoding matrix. A rank of the first precoding matrix is the first rank, and the first precoding matrix is in a first precoding matrix set. A rank of the second precoding matrix is the second rank, and the second precoding matrix is in a second precoding matrix set.

The first precoding matrix set is different from the second precoding matrix set.

For further descriptions of the first rank indicator, the first rank, the second rank indicator, the second rank, the first precoding matrix indicator, the second precoding matrix indicator, the third precoding matrix indicator, the first precoding matrix $W^A$, the second precoding matrix $W^B$, and the like, refer to the descriptions of the method embodiments of the present disclosure. For specific implementation of the processing unit of thebase station, refer to the specific implementation of the base station in the foregoing method embodiments.

Therefore, according to the base station for receiving CSI in this embodiment of the present disclosure, different precoding matrix sets are used for the common channel and the traffic channel to obtain the CSI. Overheads of a precoding matrix indicator are reduced while satisfying requirements of the common channel and the traffic channel.

In this embodiment of the present disclosure, the obtaining, by the base station, the rank indicator and the precoding matrix indicator from the terminal device may be receiving the rank indicator and the precoding matrix indicator from the terminal device. For example, the receiving, by the base station, the first precoding matrix indicator from the terminal device may be receiving the first precoding matrix indicator from the terminal device. Similarly, the obtaining, by the obtaining unit of the base station, the rank indicator and the precoding matrix indicator may be receiving, by the base station, the rank indicator and the precoding matrix indicator from the terminal device.

Figure 9:
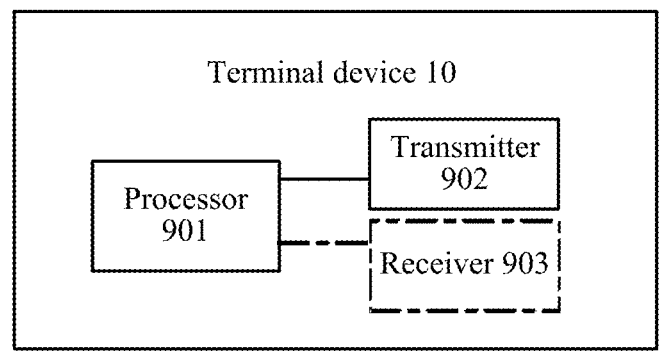
FIG. 9 is a schematic block diagram of user equipment according to another embodiment of the present disclosure.
Figure 10:
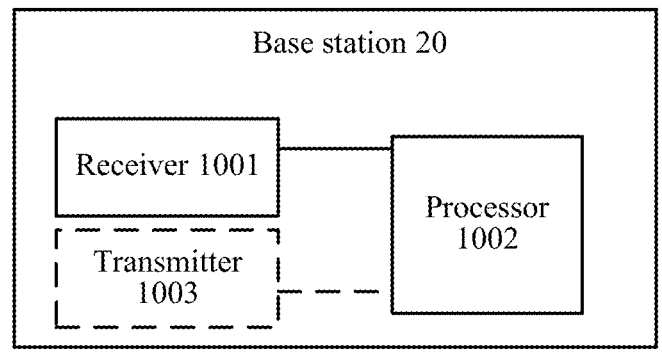
FIG. 10 is a schematic block diagram of a base station according to another embodiment of the present disclosure.

A terminal device 10 including a processor 901, a transmitter 902, and a receiver 903 is shown in FIG. 9. A base station 20 including a processor 1002, a transmitter 1003, and a receiver 1001 is shown in FIG. 10.

The processing units 501 and 601 may be specifically the processor 901. The processing units 702 and 802 may be specifically the processor 1002. Receiving units 503 and 603 may be the receiver 903. Receiving units 703 and 803 may be the receiver 1001. The sending units 502 and 602 may be the transmitter 902. The sending units 704 and 804 may be the transmitter 1003. If the first precoding matrix indicator, the second precoding matrix indicator, the first indicator, and the second rank indicator are obtained from the terminal device, the obtaining units 701 and 801 may be the receiver 1001. If the first precoding matrix indicator, the second precoding matrix indicator, and the second rank indicator are obtained from the terminal device, and the first rank indicator is a predefined value, the obtaining units 701 and 801 are the receiver 1001 and the processor 1002.

It should be understood that, the processors 901 and 1002 in the embodiments of the present disclosure may be a central processing unit (CPU), or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The objectives, technical solutions, and benefit effects of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A channel state information (CSI) sending method, comprising:
   determining, by a terminal device, a first rank for a first channel and a second rank for a second channel, wherein the first rank is indicated by a first rank indicator, the second rank is indicated by a second rank indicator, and a channel type of the first channel is different from a channel type of the second channel;
   determining, by the terminal device, a first precoding matrix in a first precoding matrix set, and determining a second precoding matrix in a second precoding matrix set, wherein the first precoding matrix set is different from the second precoding matrix set, a rank of the first precoding matrix is the first rank, the first precoding matrix is indicated by a first precoding matrix indicator, a rank of the second precoding matrix is the second rank, and the second precoding matrix is indicated by a second precoding matrix indicator, and wherein the first precoding matrix indicator is represented by $B_1$ bits, the second precoding matrix indicator is represented by $B_2$ bits, the $B_1$ bits and the $B_2$ bits are partially overlapped, and $B_1$ and $B_2$ are positive integers greater than 1; and sending, by the terminal device, the first rank indicator, the second rank indicator, the first precoding matrix indicator, and the second precoding matrix indicator to a base station, or sending, by the terminal device, the second rank indicator, the first precoding matrix indicator, and the second precoding matrix indicator to a base station, wherein the first rank indicator is a predefined value.

2. The method according to claim 1, wherein:
the first precoding matrix is $W^A$ and $W^A = W_1^A \times W_2^A$, wherein $W^A$ is an $N_t$-row by $R_A$-column matrix, $N_t$ is a quantity of antenna ports of a reference signal sent by the base station, $R_A$ is the first rank, $N_t$ is greater than or equal to $R_A$, $W_1^A$ is an $N_t$-row by 2M-column matrix, $W_2^A$ is a 2M-row by $R_A$-column matrix, $R_A$, M, and $N_t$ are positive integers, and M is greater than or equal to 2; and
the second precoding matrix is $W^B$ and $W^B = W_1^B \times W_2^B$, wherein $W^B$ is an $N_t$-row by $R^B$-column matrix, $R_B$ is the second rank, $W_1^B$ is an $N_t$-row by 2K-column matrix, $W_2^B$ is a 2K-row by $R_B$-column matrix, and $R_B$ and K are positive integers.

3. The method according to claim 1, wherein:
each precoding matrix in the first precoding matrix set satisfies that $W^1 = W_1^1 \times W_2^1$, wherein $W^1$ is an $N_t$-row by $R_A$-column matrix, $N_t$ is a quantity of antenna ports of a reference signal sent by the base station, $R_A$ is the first rank, $N_t$ is greater than or equal to $R_A$, is an $N_t$-row by 2M-column matrix, $W_2^1$ is a 2M-row by $R_A$-column matrix, $N_t$, $R_A$, and M are positive integers, and M is greater than or equal to 2; and
each precoding matrix in the second precoding matrix set satisfies that $W^2 = W_1^2 \times w_2^2$, wherein $W^2$ is an $N_t$-row by $R_B$-column matrix, $R_B$ is the second rank, $N_t$ is greater than or equal to $R_B$, $W_1^2$ is an $N_t$-row by 2K-column matrix, $W_2^2$ is a 2K-row by $R_B$-column matrix, and $R_B$ and K are positive integers.

4. The method according to claim 1, wherein the first channel is a common channel and the second channel is a traffic channel, and the method further comprises:
sending, by the terminal device, a second channel quality indicator (CQI) to the base station, wherein the second CQI is obtained based on the second precoding matrix; or
sending, by the terminal device, a first CQI and a second CQI to the base station, wherein the first CQI is obtained based on the first precoding matrix, and the second CQI is obtained based on the second precoding matrix.

5. The method according to claim 2, wherein K is less than or equal to M, and 2M columns in $W_1^A$ comprise each column in $W_1^B$.

6. The method according to claim 2, wherein the first channel is a common channel and the second channel is a traffic channel, and the method further comprises:
sending, by the terminal device, a second channel quality indicator (CQI) to the base station, wherein the second CQI is obtained based on the second precoding matrix; or
sending, by the terminal device, a first CQI and a second CQI to the base station, wherein the first CQI is obtained based on the first precoding matrix, and the second CQI is obtained based on the second precoding matrix.

7. The method according to claim 3, wherein K is less than or equal to M, a random $W_1^1$ in the first precoding matrix set corresponds to $W_1^2$ in the second precoding matrix set, and 2M columns in a random $W_1^1$ in the first precoding matrix set comprise each column in $W_1^2$ that is in the second precoding matrix set and that corresponds to the random $W_1^1$ in the first precoding matrix set.

8. A channel state information (CSI) receiving method, comprising
obtaining, by a base station, a first rank indicator, a second rank indicator, a first precoding matrix indicator, and a second precoding matrix indicator, wherein the first precoding matrix indicator, the second precoding matrix indicator, and the second rank indicator are obtained from a terminal device, and the first rank indicator is obtained from the terminal device or the first rank indicator is a predefined value, wherein the first precoding matrix indicator is represented by $B_1$ bits, the second precoding matrix indicator is represented by $B_2$ bits, the $B_1$ bits and the $B_2$ bits are partially overlapped, and $B_1$ and $B_2$ are positive integers greater than 1; and
determining a first precoding matrix based on the first precoding matrix indicator, and determining a second precoding matrix based on the second precoding matrix indicator, wherein:
the first rank indicator indicates a first rank,
the second rank indicator indicates a second rank,
the first rank is for a first channel,
the second rank is for a second channel,
a channel type of the first channel is different from a channel type of the second channel,
a rank of the first precoding matrix is the first rank, and the first precoding matrix is in a first precoding matrix set,
a rank of the second precoding matrix is the second rank, and the second precoding matrix is in a second precoding matrix set, and
the first precoding matrix set is different from the second precoding matrix set.

9. The method according to claim 8, wherein:
the first precoding matrix is $W^A$ and $W_1^A = W_1^A \times W_2^A$, wherein $W^A$ is an $N_t$-row by $R_A$-column matrix, $N_t$ is a quantity of antenna ports of a reference signal sent by the base station, $R_A$ is the first rank, $N_t$ is greater than or equal to $R_A$, $W_1^A$ is an $N_t$-row by 2M-column matrix, $W_2^A$ is a 2M-row by $R_A$-column matrix, $R_A$, M, and $N_t$ are positive integers, and M is greater than or equal to 2; and
the second precoding matrix is $W^B$ and $W_1^B = W_1^B \times W_2^A$, wherein $W^B$ is an $N_t$-row by $R_B$-column matrix, $R_B$ is the second rank, $W_1^B$ is an $N_t$-row by 2K-column matrix, $W_2^B$ is a 2K-row by $R_B$-column matrix, and $R_B$ and K are positive integers.

10. The method according to claim 8, wherein:
each precoding matrix in the first precoding matrix set satisfies that $W^1 = W_1^1 \times W_2^1$, wherein $W^1$ is an $N_t$-row by $R_A$-column matrix, $N_t$ is a quantity of antenna ports of a reference signal sent by the base station, $R_A$ is the first rank, $N_t$ is greater than or equal to $R_A$, $W_1^1$ is an $N_t$-row by 2M-column matrix, $W_2^1$ is a 2M-row by $R_A$-column matrix, $N_t$, $R_A$, and M are positive integers, and M is greater than or equal to 2; and each precoding matrix in the second precoding matrix set satisfies that $W^2 = W_1^2 \times W_2^2$, wherein $W^2$ is an $N_t$-row by $R_B$-column matrix, $R_B$ is the second rank, $N_t$ is greater than or equal to $R_B$, $W_1^2$ is an $N_t$-row by 2K-column matrix, $W_2^2$ is a 2K-row by $R_B$-column matrix, and $R_B$ and K are positive integers.

11. The method according to claim 8, wherein the first channel is a common channel and the second channel is a traffic channel, and the method further comprises:

receiving, by the base station, a second channel quality indicator (CQI) sent by the terminal device, wherein the second CQI is obtained based on the second precoding matrix; or receiving, by the base station, a first CQI and a second CQI that are sent by the terminal device, wherein the first CQI is obtained based on the first precoding matrix, and the second CQI is obtained based on the second precoding matrix.

12. The method according to claim 9, wherein K is less than or equal to M, and 2M columns in $W_1^A$ comprise each column in $W_1^B$.

13. The method according to claim 9, wherein the first channel is a common channel and the second channel is a traffic channel, and the method further comprises:

receiving, by the base station, a second channel quality indicator (CQI) sent by the terminal device, wherein the second CQI is obtained based on the second precoding matrix; or receiving, by the base station, a first CQI and a second CQI that are sent by the terminal device, wherein the first CQI is obtained based on the first precoding matrix, and the second CQI is obtained based on the second precoding matrix.

14. The method according to claim 10, wherein K is less than or equal to M, a random $W_1^1$ in the first precoding matrix set corresponds to $W_1^2$ in the second precoding matrix set, and 2M columns in a random $W_1^1$ in the first precoding matrix set comprise each column in $W_1^2$ that is in the second precoding matrix set and that corresponds to the random $W_1^1$ in the first precoding matrix set.

15. A terminal device, comprising:

at least one processor, configured to:
determine a first rank for a first channel and a second rank for a second channel, wherein the first rank is indicated by a first rank indicator, the second rank is indicated by a second rank indicator, and a channel type of the first channel is different from a channel type of the second channel,
determine a first precoding matrix in a first precoding matrix set, and determine a second precoding matrix in a second precoding matrix set, wherein the first precoding matrix set is different from the second precoding matrix set, a rank of the first precoding matrix is the first rank, the first precoding matrix is indicated by a first precoding matrix indicator, a rank of the second precoding matrix is the second rank, and the second precoding matrix is indicated by a second precoding matrix indicator, and wherein the first precoding matrix indicator is represented by $B_1$ bits, the second precoding matrix indicator is represented by $B_2$ bits, the $B_1$ bits and the bits are partially overlapped, and $B_1$ and $B_2$ are positive integers greater than 1; and a transmitter, configured to:
send the first rank indicator, the second rank indicator, the first precoding matrix indicator, and the second precoding matrix indicator to a base station, or
send the second rank indicator, the first precoding matrix indicator, and the second precoding matrix indicator to a base station, wherein the first rank indicator is a predefined value.

16. The terminal device according to claim 15, wherein:

the first precoding matrix is $W^A$ and $W^A = W_1^A \times W_2^A$, wherein $W^A$ is an $N_t$-row by $R_A$-column matrix, $N_t$ is a quantity of antenna ports of a reference signal sent by a base station, $R_A$ is the first rank, $N_t$ is greater than or equal to $R_A$, $W_1^A$ is an $N_t$-row by 2M-column matrix, $W_2^A$ is a 2M-row by $R_A$-column matrix, $R_A$, M, and $N_t$ are positive integers, and M is greater than or equal to 2; and the second precoding matrix is $W^B$ and $W^B = W_1^B \times W_2^B$, wherein $W^B$ is an $N_t$-row by $R^B$-column matrix, $R_B$ is the second rank, $W_1^B$ is an $N_t$-row by 2K-column matrix, $W_2^B$ is a 2K-row by $R_B$-column matrix, and $R_B$ and K are positive integers.

17. The terminal device according to claim 15, wherein:

each precoding matrix in the first precoding matrix set satisfies that $W^1 = W_1^1 \times W_2^1$, wherein $W^1$ is an $N_t$-row by $R_A$-column matrix, $N_t$ is a quantity of antenna ports of a reference signal sent by the base station, $R_A$ is the first rank, $N_t$ is greater than or equal to $R_A$, $W_1^1$ is an $N_t$-row by 2M-column matrix, $W_2^1$ is a 2M-row by $R_A$-column matrix, $N_t$, $R_A$, and M are positive integers, and M is greater than or equal to 2; and each precoding matrix in the second precoding matrix set satisfies that $W^2 = W_1^2 \times W_2^2$, wherein $W^2$ is an $N_t$-row by $R_B$-column matrix, $R_B$ is the second rank, $N_t$ is greater than or equal to $R_B$, $W_1^2$ is an $N_t$-row by 2K-column matrix, $W_2^2$ is a 2K-row by $R_B$-column matrix, and $R_B$ and K are positive integers.

18. The terminal device according to claim 15, wherein:

the first channel is a common channel, and the second channel is a traffic channel; and the transmitter is further configured to:
send a second channel quality indicator (CQI) to the base station, wherein the second CQI is obtained based on the second precoding matrix, or
send a first CQI and a second CQI to the base station, wherein the first CQI is obtained based on the first precoding matrix, and the second CQI is obtained based on the second precoding matrix.

19. The terminal device according to claim 16, wherein:

the first channel is a common channel, and the second channel is a traffic channel; and the transmitter is further configured to:
send a second channel quality indicator (CQI) to the base station, wherein the second CQI is obtained based on the second precoding matrix, or
send a first CQI and a second CQI to the base station, wherein the first CQI is obtained based on the first precoding matrix, and the second CQI is obtained based on the second precoding matrix.

20. The terminal device according to claim 17, wherein K is less than or equal to M, a random $W_1^1$ in the first precoding matrix set corresponds to $W_1^2$ in the second precoding matrix set, and 2M columns in a random $W_1^1$ in the first precoding matrix set comprise each column in $W_1^2$ that is in the second precoding matrix set and that corresponds to the random $W_1^1$ in the first precoding matrix set.

* * * * *

UNITED STATES PATENT AND TRADEMARK OFFICE
CERTIFICATE OF CORRECTION

PATENT NO. : 10,567,054 B2  
APPLICATION NO. : 16/266735  
DATED : February 18, 2020  
INVENTOR(S) : Liu Page 1 of 1

It is certified that error appears in the above-identified patent and that said Letters Patent is hereby corrected as shown below:

In the Claims

In Column 29, Line 29, Claim 2, delete "$R^B$" and insert --$R_B$--.

In Column 29, Lines 38-39, Claim 3, delete "$R_A$, is an $N_t$-row by 2M-column matrix" and insert --$R_A$, $W_1^1$ is an $N_t$-row by 2M-column matrix--.

In Column 29, Line 43, Claim 3, delete "$W^2 = W_1^2 \times w_2^2$" and insert --$W^2 = W_1^2 \times W_2^2$--.

In Column 30, Line 48, Claim 9, delete "$W_1^A = W_1^A \times W_2^A$" and insert --$W^A = W_1^A \times W_2^A$--.

In Column 30, Line 56, Claim 9, delete "$W_1^B = W_1^B \times W_2^A$" and insert --$W^B = W_1^B \times W_2^B$--.

In Column 31, Line 65, Claim 15, delete "the $B_1$ bits and the bits" and insert --the $B_1$ bits and the $B_2$ bits--.

Signed and Sealed this  
First Day of September, 2020

Andrei Iancu  
*Director of the United States Patent and Trademark Office*